United States Patent
Lou et al.

(10) Patent No.: US 11,678,259 B2
(45) Date of Patent: Jun. 13, 2023

(54) NETWORK SLICE SELECTION METHOD, TERMINAL DEVICE, AND NETWORK DEVICE

(71) Applicant: HUAWEI TECHNOLOGIES CO., LTD., Guangdong (CN)

(72) Inventors: Chong Lou, Shanghai (CN); Yada Huang, Shanghai (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/367,735

(22) Filed: Mar. 28, 2019

(65) Prior Publication Data

US 2019/0230584 A1 Jul. 25, 2019

Related U.S. Application Data

(63) Continuation of application No. PCT/CN2017/104015, filed on Sep. 28, 2017.

(30) Foreign Application Priority Data

Sep. 28, 2016 (CN) .......................... 201610859931.6

(51) Int. Cl.
*H04W 48/16* (2009.01)
*H04W 48/18* (2009.01)
(Continued)

(52) U.S. Cl.
CPC ........... *H04W 48/16* (2013.01); *H04W 48/18* (2013.01); *H04W 72/569* (2023.01);
(Continued)

(58) Field of Classification Search
None
See application file for complete search history.

(56) References Cited

U.S. PATENT DOCUMENTS

2017/0245140 A1* 8/2017 Au .................. H04W 76/27
2017/0257886 A1   9/2017 Adjakple et al.
(Continued)

FOREIGN PATENT DOCUMENTS

CN         103650437 A     3/2014
CN         104105219 A    10/2014
(Continued)

OTHER PUBLICATIONS

Office Action issued in Chinese Application No. 201610859931.6 dated Mar. 4, 2020, 21 pages (with English translation).
(Continued)

*Primary Examiner* — Shripal K Khajuria
(74) *Attorney, Agent, or Firm* — Fish & Richardson P.C.

(57) ABSTRACT

A network slice selection method is provided, so that in a scenario in which one terminal device subscribes to a plurality of network slices, a network device can select a network slice for the terminal device. The method includes: a terminal device sends a first message to a network device, wherein the first message is used to request to select a network slice for the terminal device. Then the terminal device receives a second message sent by the network device, wherein the second message is used to indicate a network slice selected by the network device for the terminal device.

32 Claims, 9 Drawing Sheets

(51) Int. Cl.
  H04W 74/08   (2009.01)
  H04W 76/12   (2018.01)
  H04W 76/27   (2018.01)
  H04W 76/11   (2018.01)
  H04W 72/566  (2023.01)
  H04W 76/10   (2018.01)

(52) U.S. Cl.
  CPC ........ *H04W 74/0833* (2013.01); *H04W 76/11* (2018.02); *H04W 76/12* (2018.02); *H04W 76/27* (2018.02); *H04W 76/10* (2018.02)

(56) References Cited

U.S. PATENT DOCUMENTS

| | | | | |
|---|---|---|---|---|
| 2019/0037409 | A1* | 1/2019 | Wang | H04W 8/08 |
| 2020/0187182 | A1* | 6/2020 | Shimojou | H04L 45/38 |

FOREIGN PATENT DOCUMENTS

| | | |
|---|---|---|
| CN | 104639653 A | 5/2015 |
| CN | 104685935 A | 6/2015 |
| CN | 106572516 A | 4/2017 |
| EP | 2629467 A1 | 8/2013 |
| WO | 2015178035 A1 | 11/2015 |

OTHER PUBLICATIONS

3GPP TR 22.891 V14.1.0 (Jun. 2016), 3rd Generation Partnership Project; Technical Specification Group Services and System Aspects; Feasibility Study on New Services and Markets Technology Enablers; Stage 1 (Release 14), Jun. 2016, 95 pages.

3GPP TR 23.799 V1.0.0 (Sep. 2016), 3rd Generation Partnership Project; Technical Specification Group Services and System Aspects; Study on Architecture for Next Generation System (Release 14), Sep. 2016, 423 pages.

Extended European Search Report issued in European Application No. 17854944.0 dated May 16, 2019, 11 pages.

PCT International Search Report and Written Opinion issued in International Application No. PCT/CN2017/104015 dated Dec. 29, 2017, 21 pages (with English translation).

R2-165019, Huawei, "Key principles for Support of Network Slicing in RAN," RAN WG2 Meeting #95, 3GPP Draft, Aug. 22-26, 2016, Gothenburg, Sweden, 4 pages.

R3-161356, Nokia et al., "Solutions for for Network Slice Selection," 3GPP TSG-RAN WG3 Meeting #92, 3GPP Draft, May 23-27, 2016, Nanjing, China, 6 pages.

S2-161480, Ericsson, "Solution for selection of a network slice instance," SA WG2 Meeting #114, Apr. 11-15, 2016, Sophia Antipolis, France, 4 pages.

S2-161481, Ericsson, "Solution for selection of a network slice instance with initial bootstrap," SA WG2 Meeting #114, Apr. 11-15, 2016, Sophia Antipolis, France, 4 pages.

S2-161574, Motorola Mobility et al., "Solution:PDU Sessions served by different Network Slices," SA WG2 Meeting #114, 3GPP Draft, Apr. 11-15, 2016, Sophia Antipolis, France, 4 pages.

S2-162652, CATT, "Network slicing architecture and slice selection mechanism," SA WG2 Meeting #115, 3GPP Draft, May 23-27, 2016, Nanjing, P.R. China, 4 pages.

TD SP-160667, SA WG2, "TR 23.799: 'Study on Architecture for Next Generation System' for Information," 3GPP TSG SA Meeting #73, SA WG2 Meeting #116bis, New Orleans, USA, Sep. 21-23, 2016, 2 pages.

Huawei, "Network slice selection," RAN WG3 Meeting #92, R3-161134, Nanjing, China, May 23-27, 2016, 4 pages.

Huawei, "RAN Support for Core Network Slicing," Ran WG3 Meeting #93, R3-161759, Gothenburg, Sweden, Aug. 22-26, 2016, 13 pages.

Office Action issued in Chinese Application No. 202110187242.6 dated Oct. 26, 2021, 9 pages.

Yang et al., "Initial Analysis of 5G Mobile Network Slicing Technology," Designing Techniques of Posts and Telecommunications, Jun. 2017, 4 pages (English abstract).

* cited by examiner

NETWORK SLICE SELECTION METHOD, TERMINAL DEVICE, AND NETWORK DEVICE

CROSS-REFERENCE TO RELATED APPLICATIONS

This application is a continuation of International Application No. PCT/CN2017/104015, filed on Sep. 28, 2017, which claims priority to Chinese Patent Application No. 201610859931.6, filed on Sep. 28, 2016, the disclosures of the aforementioned applications are hereby incorporated by reference in their entireties.

TECHNICAL FIELD

The present invention relates to the field of wireless communications technologies, and in particular, to a network slice selection method, a terminal device, and a network device.

BACKGROUND

As various communications services continuously emerge, and different communications services have evidently different requirements for network performance, a fifth generation (the fifth generation, 5G) mobile communications system introduces a concept of a network slice (network slice, NS), to meet different requirements of different communications services for network performance.

The network slice is a set of logical network functional entities that support a specific communications service requirement, and mainly uses a software-defined networking (software defined network, SDN) technology and a Network Functions Virtualization (network function virtualization, NFV) technology to implement a customizable communications service.

Currently, one terminal device is allowed to access a plurality of network slices, so that the terminal device can support various communications services, and user experience can be improved. In the prior art, a network device selects a suitable network slice for a terminal device, and associates the terminal device with the suitable network slice. To be specific, the network device allocates a network slice identifier (network slice identification, NSID) to the terminal device. The network device may be a radio access network (radio access network, RAN) device or a core network (core network, CN) device.

In a solution, in a process in which a terminal device registers with a public land mobile network (public land mobile network, PLMN), a network device selects a network slice for the terminal device based on subscription information of the terminal device. This solution is applicable to a scenario in which the terminal device subscribes to a single network slice. However, in a scenario in which the terminal device subscribes to a plurality of network slices, the network device cannot select a suitable network slice for the terminal device based on only subscription information of the terminal device.

In conclusion, in a scenario in which one terminal device subscribes to a plurality of network slices, a network device cannot select a network slice for the terminal device in the prior art.

SUMMARY

Embodiments of the present invention provide a network slice selection method, a terminal device, and a network device, so that in a scenario in which one terminal device subscribes to a plurality of network slices, the network device can select a network slice for the terminal device.

According to a first aspect, an embodiment of the present invention provides a network slice selection method, including:

generating, by a terminal device, first information, then sending a first message including the first information to a network device, where the first message is used to request to select a network slice for the terminal device, and the first information includes any one or any combination of the following: information about a first network slice, first service information, and access information of the terminal device; and receiving, by the terminal device, a second message sent by the network device, where the second message is used to indicate a network slice selected by the network device for the terminal device.

The terminal device sends the first information to the network device, and the network device selects the network slice for the terminal device based on the first information, so that the network device can select a network slice for the terminal device. The prior-art problem that in a scenario in which one terminal device subscribes to a plurality of network slices, a network device cannot select a suitable network slice for the terminal device based on only subscription information of the terminal device can be resolved by using the foregoing method.

In the foregoing method, the first service information includes but is not limited to any one or any combination of the following: a service application identifier, a flow identifier, a data packet identifier, a tunnel identifier, a radio bearer identifier, a service type, a user usage type, an access point address, and an access point identifier.

The access information of the terminal device includes but is not limited to any one or any combination of the following: a level of the terminal device, a random access channel RACH channel type, and a random access preamble sequence.

In this way, because the first information includes different pieces of information, the network device may select a proper network slice for the terminal device based on the different pieces of information.

In a possible design, when the first information includes the information about the first network slice, the terminal device may generate the information about the first network slice by using the following methods:

when the terminal device has preconfigured an identifier of a unique network slice, using, by the terminal device, the unique network slice identifier as the information about the first network slice; or selecting, by the terminal device, a network slice identifier of a network slice with a highest priority as the information about the first network slice; or using, by the terminal device as the information about the first network slice, a network slice identifier of a network slice corresponding to a service initiated by the terminal device.

In a possible design, when the terminal device has preconfigured a network slice identifier, before the terminal device generates the information about the first network slice, the terminal device may receive a third message that is sent by the network device and that includes second network slice information. The second network slice information is used to indicate a network slice selected by the network device based on a location of the terminal device. The terminal device preconfigures the network slice identifier based on the second network slice information.

Because the second network slice information is used to indicate the network slice selected by the network device based on the location of the terminal device, the terminal device preconfigures the network slice identifier based on the second network slice information. If the preconfigured network slice identifier is used by the network device to select the network slice for the terminal device, the network device can select a suitable network slice for the terminal device more accurately.

In a possible design, when the terminal device has preconfigured a network slice identifier, before the terminal device generates the information about the first network slice, the terminal device receives a fourth message sent by the network device. The fourth message includes access barring information corresponding to each of at least one network slice. The terminal device learns of, based on the fourth message, access barring information corresponding to a network slice indicated by the preconfigured network slice identifier, identifies a network slice that can be accessed in the network slice indicated by the preconfigured network slice identifier, and retains an identifier of the network slice that can be accessed.

In this way, the terminal device may retain, in the preconfigured network slice identifier, the identifier of the network slice that can be accessed. If the identifier of the network slice that can be accessed is used by the network device to select the network slice for the terminal device, the network device can select a suitable network slice for the terminal device more accurately.

In a possible design, when the terminal device has preconfigured a network slice identifier, before the terminal device generates the information about the first network slice, the terminal device receives a fifth message sent by the network device. The fifth message is used to indicate a network slice that can be accessed in at least one network slice. The terminal device learns of, based on the fifth message, a network slice that can be accessed in a network slice indicated by the preconfigured network slice identifier, and retains an identifier of the network slice that can be accessed.

In this way, the terminal device may retain, in the preconfigured network slice identifier, the identifier of the network slice that can be accessed. If the identifier of the network slice that can be accessed is used by the network device to select the network slice for the terminal device, the network device can select a suitable network slice for the terminal device more accurately.

In a possible design, the first message further includes a network functional entity identifier.

In this way, the network device can select a suitable network functional entity for the terminal device based on the network functional entity identifier included in the first message.

According to a second aspect, an embodiment of the present invention provides a network slice selection method, including:

receiving, by a network device, a first message that is sent by a terminal device and that includes first information, selecting a network slice for the terminal device based on the first information, and sending a second message to the terminal device, where the second message is used to indicate the network slice selected by the network device for the terminal device.

The first message is used to request to select the network slice for the terminal device, and the first information includes any one or any combination of the following: information about a first network slice, first service information, and access information of the terminal device.

Because the network device selects the network slice for the terminal device based on the first information sent by the terminal device, the prior-art problem that when one terminal device subscribes to a plurality of network slices, a network device cannot select a suitable network slice for the terminal device based on only subscription information of the terminal device can be resolved.

In the foregoing method, the first service information includes but is not limited to any one or any combination of the following: a service application identifier, a flow identifier, a data packet identifier, a tunnel identifier, a radio bearer identifier, a service type, a user usage type, an access point address, and an access point identifier.

The access information of the terminal device includes but is not limited to any one or any combination of the following: a level of the terminal device, a random access channel RACH channel type, and a random access preamble sequence.

In this way, because the first information includes different pieces of information, the network device may select a proper network slice for the terminal device based on the different pieces of information.

In a possible design, the network device may select a network slice for the terminal device based on the first information by using the following methods:

when the first information includes the information about the first network slice, using, by the network device, a network slice indicated by the information about the first network slice as the network slice selected for the terminal device; or when the first information includes the first service information, using, by the network device based on a service indicated by the first service information and a mapping relationship between a service and a network slice, a network slice corresponding to the service indicated by the first service information as the network slice selected for the terminal device; or when the first information includes the access information of the terminal device, selecting, by the network device, the network slice for the terminal device based on the access information of the terminal device.

In a possible design, the network device may further obtain a location of the terminal device before receiving the first message that is sent by the terminal device and that includes the first information;

the network device selects a network slice corresponding to a service area in which the location of the terminal device lies, and determines second network slice information that is used to indicate the selected network slice; and the network device sends a third message including the second network slice information to the terminal device, and the second network slice information is used by the terminal device to preconfigure a network slice identifier.

Because the second network slice information is used to indicate the network slice selected by the network device based on the location of the terminal device, the terminal device may preconfigure the network slice identifier based on the second network slice information. If the preconfigured network slice identifier is used by the network device to select the network slice for the terminal device, the network device can select a suitable network slice for the terminal device more accurately.

In a possible design, the network device may further send a fourth message to the terminal device before receiving the first message that is sent by the terminal device and that includes the first information. The fourth message includes access barring information corresponding to each of at least one network slice, and the fourth message is used by the terminal device to identify a network slice that can be accessed.

In this way, the terminal device may retain, in a preconfigured network slice identifier based on the fourth message, the identifier of the network slice that can be accessed. If the identifier of the network slice that can be accessed is used by the network device to select the network slice for the terminal device, the network device can select a suitable network slice for the terminal device more accurately.

In a possible design, the network device may further send a fifth message to the terminal device before receiving the first message that is sent by the terminal device and that includes the first information. The fifth message is used to indicate a network slice that can be accessed in at least one network slice, and the fifth message is used by the terminal device to identify a network slice that can be accessed.

In this way, the terminal device may retain, in a preconfigured network slice identifier based on the fifth message, the identifier of the network slice that can be accessed. If the identifier of the network slice that can be accessed is used by the network device to select the network slice for the terminal device, the network device can select a suitable network slice for the terminal device more accurately.

In a possible design, after the selecting, by the network device, a network slice for the terminal device based on the first information, the method further includes:

when the first message further includes a network functional entity identifier, using, by the network device as a network functional entity selected for the terminal device, a network functional entity indicated by the network functional entity identifier; or selecting, by the network device based on the first information from a network functional entity connected to the network device, a network functional entity that supports the network slice selected for the terminal device, and using the selected network functional entity as a network functional entity selected for the terminal device.

In this way, the network device can select a suitable network functional entity for the terminal device.

According to a third aspect, an embodiment of the present invention provides a terminal device, including a processing unit, a sending unit, and a receiving unit, where the processing unit is configured to generate first information, where the first information includes any one or any combination of the following: information about a first network slice, first service information, and access information of the terminal device;

the sending unit is configured to send, to a network device, a first message including the first information generated by the processing unit, where the first message is used to request to select a network slice for the terminal device; and the receiving unit is configured to receive a second message sent by the network device, where the second message is used to indicate a network slice selected by the network device for the terminal device.

In a possible design, when the first information includes the information about the first network slice, and the processing unit generates the information about the first network slice, the processing unit is specifically configured to:

when the terminal device has preconfigured an identifier of a unique network slice, use the unique network slice identifier as the information about the first network slice; or select a network slice identifier of a network slice with a highest priority as the information about the first network slice; or use, as the information about the first network slice, a network slice identifier of a network slice corresponding to a service initiated by the terminal device.

In a possible design, the first service information includes any one or any combination of the following: a service application identifier, a flow identifier, a data packet identifier, a tunnel identifier, a radio bearer identifier, a service type, a user usage type, an access point address, and an access point identifier.

In a possible design, the access information of the terminal device includes any one or any combination of the following:

a level of the terminal device, a random access channel RACH channel type, and a random access preamble sequence.

In a possible design, when the terminal device has preconfigured a network slice identifier, the receiving unit is further configured to:

before the processing unit generates the information about the first network slice, receive a third message that is sent by the network device and that includes second network slice information, where the second network slice information is used to indicate a network slice selected by the network device based on a location of the terminal device; and the processing unit is further configured to:

preconfigure the network slice identifier based on the second network slice information received by the receiving unit.

In a possible design, when the terminal device has preconfigured a network slice identifier, the receiving unit is further configured to:

before the processing unit generates the information about the first network slice, receive a fourth message sent by the network device, where the fourth message includes access barring information corresponding to each of at least one network slice; and the processing unit is further configured to:

learn of, based on the fourth message received by the receiving unit, access barring information corresponding to a network slice indicated by the preconfigured network slice identifier, identify a network slice that can be accessed in the network slice indicated by the preconfigured network slice identifier, and retain an identifier of the network slice that can be accessed.

In a possible design, when the terminal device has preconfigured a network slice identifier, the receiving unit is further configured to:

before the processing unit generates the information about the first network slice, receive a fifth message sent by the network device, where the fifth message is used to indicate a network slice that can be accessed in at least one network slice; and the processing unit is further configured to:

learn of, based on the fifth message received by the receiving unit, a network slice that can be accessed in a network slice indicated by the preconfigured network slice identifier, and retain an identifier of the network slice that can be accessed.

In a possible design, the first message further includes a network functional entity identifier.

According to a fourth aspect, an embodiment of the present invention provides a terminal device, including a processor, a transceiver, and a memory.

The memory is configured to store data used by the processor when the processor performs an operation.

The transceiver is configured to receive and send data under control of the processor.

The processor is configured to read a program in the memory, to execute the following process:

The processor is configured to generate first information. The first information includes any one or any combination of the following: information about a first network slice, first service information, and access information of the terminal device. The processor is further configured to:

send, by using the transceiver, a first message including the first information to a network device, where the first message is used to request to select a network slice for the terminal device; and receive, by using the transceiver, a second message sent by the network device, where the second message is used to indicate a network slice selected by the network device for the terminal device.

In a possible design, when the first information includes the information about the first network slice, and the processor generates the information about the first network slice, the processor is specifically configured to:

when the terminal device has preconfigured an identifier of a unique network slice, use the unique network slice identifier as the information about the first network slice; or select a network slice identifier of a network slice with a highest priority as the information about the first network slice; or use, as the information about the first network slice, a network slice identifier of a network slice corresponding to a service initiated by the terminal device.

In a possible design, the first service information includes any one or any combination of the following: a service application identifier, a flow identifier, a data packet identifier, a tunnel identifier, a radio bearer identifier, a service type, a user usage type, an access point address, and an access point identifier.

In a possible design, the access information of the terminal device includes any one or any combination of the following:

a level of the terminal device, a random access channel RACH channel type, and a random access preamble sequence.

In a possible design, when the terminal device has preconfigured a network slice identifier, the processor is further configured to:

before the processor generates the information about the first network slice, receive, by using the transceiver, a third message that is sent by the network device and that includes second network slice information, where the second network slice information is used to indicate a network slice selected by the network device based on a location of the terminal device; and preconfigure the network slice identifier based on the second network slice information.

In a possible design, when the terminal device has preconfigured a network slice identifier, the processor is further configured to:

before the processor generates the information about the first network slice, receive, by using the transceiver, a fourth message sent by the network device, where the fourth message includes access barring information corresponding to each of at least one network slice; and learn of, based on the fourth message, access barring information corresponding to a network slice indicated by a preconfigured network slice identifier, identify a network slice that can be accessed in the network slice indicated by the preconfigured network slice identifier, and retain an identifier of the network slice that can be accessed.

In a possible design, when the terminal device has preconfigured a network slice identifier, the processor is further configured to:

before the processor generates the information about the first network slice, receive, by using the transceiver, a fifth message sent by the network device, where the fifth message is used to indicate a network slice that can be accessed in at least one network slice; and learn of, based on the fifth message, a network slice that can be accessed in a network slice indicated by the preconfigured network slice identifier, and retain an identifier of the network slice that can be accessed.

In a possible design, the first message further includes a network functional entity identifier.

According to a fifth aspect, an embodiment of the present invention provides a system chip, where the system chip is applied to a terminal device, and the system chip includes an input/output interface, at least one processor, a memory, a bus, and the like. The input/output interface, the at least one processor, and the memory are connected to each other by using the bus. The memory is configured to store data that needs to be transmitted, the processor executes a program of the technical solution in any design of the first aspect, and the input/output interface is used to receive and send the data that needs to be transmitted. The processor is configured to execute the program for the technical solution in any design of the first aspect.

According to a sixth aspect, an embodiment of the present invention provides a computer readable medium, configured to store a computer software instruction used to execute the technical solution in any design of the first aspect, and the computer software instruction includes a program designed to perform the technical solution in any design of the first aspect.

According to a seventh aspect, an embodiment of the present invention provides a network device, including a receiving unit, a processing unit, and a sending unit, where the receiving unit is configured to receive a first message that is sent by a terminal device and that includes first information, where the first message is used to request to select a network slice for the terminal device, and the first information includes any one or any combination of the following: information about a first network slice, first service information, and access information of the terminal device;

the processing unit is configured to select a network slice for the terminal device based on the first information received by the receiving unit; and the sending unit is configured to send a second message to the terminal device, where the second message is used to indicate the network slice selected by the processing unit for the terminal device.

In a possible design, the processing unit is specifically configured to:

when the first information includes the information about the first network slice, use a network slice indicated by the information about the first network slice as the network slice selected for the terminal device; or when the first information includes the first service information, use, based on a service indicated by the first service information and a mapping relationship between a service and a network slice, a network slice corresponding to the service indicated by the first service information as the network slice selected for the terminal device; or when the first information includes the access information of the terminal device, select the network slice for the terminal device based on the access information of the terminal device.

In a possible design, the first service information includes any one or any combination of the following: a service application identifier, a flow identifier, a data packet identifier, a tunnel identifier, and a radio bearer identifier.

In a possible design, the access information of the terminal device includes any one or any combination of the following:

a level of the terminal device, a random access channel RACH channel type, and a random access preamble sequence.

In a possible design, the processing unit is further configured to:

obtain a location of the terminal device before the receiving unit receives the first message that is sent by the terminal device and that includes the first information; and select a network slice corresponding to a service area in which the location of the terminal device lies, and determine second network slice information that is used to indicate the selected network slice; and the sending unit is further configured to:

send, to the terminal device, a third message including the second network slice information selected by the processing unit, where the second network slice information is used by the terminal device to preconfigure a network slice identifier.

In a possible design, the sending unit is further configured to:

send a fourth message to the terminal device before the receiving unit receives the first message that is sent by the terminal device and that includes the first information, where the fourth message includes access barring information corresponding to each of at least one network slice, and the fourth message is used by the terminal device to identify a network slice that can be accessed.

In a possible design, the sending unit is further configured to:

send a fifth message to the terminal device before the receiving unit receives the first message that is sent by the terminal device and that includes the first information, where the fifth message is used to indicate a network slice that can be accessed in at least one network slice, and the fifth message is used by the terminal device to identify a network slice that can be accessed.

In a possible design, the processing unit is further configured to:

after the processing unit selects the network slice for the terminal device based on the first information, when the first message further includes a network functional entity identifier, use, as a network functional entity selected for the terminal device, a network functional entity indicated by the network functional entity identifier; or after the processing unit selects the network slice for the terminal device based on the first information, select, based on the first information from a network functional entity connected to the network device, a network functional entity that supports the network slice selected for the terminal device, and use the selected network functional entity as a network functional entity selected for the terminal device.

According to an eighth aspect, an embodiment of the present invention provides a network device, including a processor, a transceiver, and a memory.

The memory is configured to store data used by the processor when the processor performs an operation.

The transceiver is configured to receive and send data under control of the processor.

The processor is configured to read a program in the memory, to execute the following process:

The processor is configured to receive, by using the transceiver, a first message that is sent by a terminal device and that includes first information, where the first message is used to request to select a network slice for the terminal device, and the first information includes any one or any combination of the following: information about a first network slice, first service information, and access information of the terminal device;

select a network slice for the terminal device based on the first information; and send a second message to the terminal device by using the transceiver, where the second message is used to indicate the network slice selected by the processor 1002 for the terminal device.

In a possible design, when selecting the network slice for the terminal device based on the first information, the processor is specifically configured to:

when the first information includes the information about the first network slice, use a network slice indicated by the information about the first network slice as the network slice selected for the terminal device; or when the first information includes the first service information, use, based on a service indicated by the first service information and a mapping relationship between a service and a network slice, a network slice corresponding to the service indicated by the first service information as the network slice selected for the terminal device; or when the first information includes the access information of the terminal device, select the network slice for the terminal device based on the access information of the terminal device.

In a possible design, the first service information includes any one or any combination of the following: a service application identifier, a flow identifier, a data packet identifier, a tunnel identifier, and a radio bearer identifier.

In a possible design, the access information of the terminal device includes any one or any combination of the following:

a level of the terminal device, a random access channel RACH channel type, and a random access preamble sequence.

In a possible design, the processor is further configured to:

obtain a location of the terminal device before receiving, by using the transceiver, the first message that is sent by the terminal device and that includes the first information;

select a network slice corresponding to a service area in which the location of the terminal device lies, and determine second network slice information that is used to indicate the selected network slice; and send, by using the transceiver, a third message including the second network slice information to the terminal device, where the second network slice information is used by the terminal device to preconfigure a network slice identifier.

In a possible design, the processor is further configured to:

send, by using the transceiver, a fourth message to the terminal device before receiving, by using the transceiver, the first message that is sent by the terminal device and that includes the first information, where the fourth message includes access barring information corresponding to each of at least one network slice, and the fourth message is used by the terminal device to identify a network slice that can be accessed.

In a possible design, the processor is further configured to:

send, by using the transceiver, a fifth message to the terminal device before receiving, by using the transceiver, the first message that is sent by the terminal device and that includes the first information, where the fifth message is used to indicate a network slice that can be accessed in at least one network slice, and the fifth message is used by the terminal device to identify a network slice that can be accessed.

In a possible design, the processor is further configured to:

after the processor selects the network slice for the terminal device based on the first information, when the first message further includes a network functional entity identifier, use, as a network functional entity selected for the terminal device, a network functional entity indicated by the network functional entity identifier; or after the processor selects the network slice for the terminal device based on the first information, select, based on the first information from a network functional entity connected to the network device, a network functional entity that supports the network slice selected for the terminal device, and use the selected network functional entity as a network functional entity selected for the terminal device.

According to a ninth aspect, an embodiment of the present invention provides a system chip, where the system chip is applied to a network device, and the system chip includes an input/output interface, at least one processor, a memory, a bus, and the like. The input/output interface, the at least one processor, and the memory are connected to each other by using the bus. The memory is configured to store data that needs to be transmitted, the processor executes a program of the technical solution in any design of the second aspect, and the input/output interface is used to receive and send the data that needs to be transmitted. The processor is configured to execute the program for the technical solution in any design of the second aspect.

According to a tenth aspect, an embodiment of the present invention provides a computer readable medium, configured to store a computer software instruction used to execute the technical solution in any design of the second aspect, and the computer software instruction includes a program designed to perform the technical solution in any design of the second aspect.

According to an eleventh aspect, an embodiment of the present invention provides a network slice selection method, including:

sending, by a terminal device, a first message to a network device, where the first message is used to request to select a network slice for the terminal device; the first message includes first information, and the first information includes any one or any combination of the following: information about a first network slice, first service information, and access information of the terminal device; and the first network slice is a network slice corresponding to a service initiated by the terminal device; or the first network slice is a network slice with a highest priority; or when the terminal device has preconfigured an identifier of a unique network slice, the first network slice is the unique network slice; and receiving, by the terminal device, a second message sent by the network device, where the second message is used to indicate a network slice selected by the network device for the terminal device.

In a possible design, the first network slice has a mapping relationship with the service initiated by the terminal device;

the terminal device receives signaling from the network device, and the signaling includes the mapping relationship; and the signaling includes any one of the following: a radio resource control message, a non-access stratum message, and a medium access control layer message.

In a possible design, the first service information includes any one or any combination of the following: a service application identifier, a flow identifier, a data packet identifier, a tunnel identifier, a radio bearer identifier, a service type, a user usage type, an access point address, and an access point identifier.

In a possible design, the access information of the terminal device includes any one or any combination of the following:

a level of the terminal device, a random access channel RACH channel type, and a random access preamble sequence.

In a possible design, the method further includes: receiving, by the terminal device, a third message that is sent by the network device and that includes second network slice information, where the second network slice information is used to indicate a network slice selected by the network device based on a location of the terminal device; and preconfiguring, by the terminal device, a network slice identifier based on the second network slice information.

In a possible design, the method further includes: receiving, by the terminal device, a fourth message sent by the network device, where the fourth message includes access barring information corresponding to each of at least one network slice; and learning of, by the terminal device based on the fourth message, access barring information corresponding to a network slice indicated by a preconfigured network slice identifier, identifying a network slice that can be accessed in the network slice indicated by the preconfigured network slice identifier, and retaining an identifier of the network slice that can be accessed.

In a possible design, the method further includes: receiving, by the terminal device, a fifth message sent by the network device, where the fifth message is used to indicate a network slice that can be accessed in at least one network slice; and learning of, by the terminal device based on the fifth message, a network slice that can be accessed in a network slice indicated by a preconfigured network slice identifier, and retaining an identifier of the network slice that can be accessed.

In a possible design, the first message further includes a network functional entity identifier.

According to a twelfth aspect, an embodiment of the present invention provides a network slice selection method, including:

receiving, by a network device, a first message sent by a terminal device, where the first message is used to request to select a network slice for the terminal device; the first message includes first information, and the first information includes any one or any combination of the following: information about a first network slice, first service information, and access information of the terminal device; and the first network slice is a network slice corresponding to a service initiated by the terminal device; or the first network slice is a network slice with a highest priority; or when the terminal device has preconfigured an identifier of a unique network slice, the first network slice is the unique network slice; selecting, by the network device, a network slice for the terminal device based on the first information; and sending, by the network device, a second message to the terminal device, where the second message is used to indicate the network slice selected by the network device for the terminal device.

In a possible design, the first network slice has a mapping relationship with the service initiated by the terminal device;

the network device sends signaling to the terminal device, and the signaling includes the mapping relationship; and the signaling includes any one of the following: a radio resource control message, a non-access stratum message, and a medium access control layer message.

In a possible design, the first service information includes any one or any combination of the following: a service application identifier, a flow identifier, a data packet identifier, a tunnel identifier, and a radio bearer identifier.

In a possible design, the access information of the terminal device includes any one or any combination of the following:

a level of the terminal device, a random access channel RACH channel type, and a random access preamble sequence.

In a possible design, the method further includes: obtaining, by the network device, a location of the terminal device;

selecting, by the network device, a network slice corresponding to a service area in which the location of the terminal device lies, and determining second network slice information that is used to indicate the selected network slice; and sending, by the network device, a third message including the second network slice information to the terminal device, where the second network slice information is used by the terminal device to preconfigure a network slice identifier.

In a possible design, the method further includes:

sending, by the network device, a fourth message to the terminal device, where the fourth message includes access barring information corresponding to each of at least one network slice, and the fourth message is used by the terminal device to identify a network slice that can be accessed.

In a possible design, the method further includes:

sending, by the network device, a fifth message to the terminal device, where the fifth message is used to indicate a network slice that can be accessed in at least one network slice, and the fifth message is used by the terminal device to identify a network slice that can be accessed.

In a possible design, the method further includes:

when the first message further includes a network functional entity identifier, a network functional entity selected for the terminal device is a network functional entity indicated by the network functional entity identifier; or a network functional entity selected by the network device for the terminal device from a network functional entity connected to the network device is a network functional entity that is selected based on the first information and that supports the network slice selected for the terminal device.

According to a thirteenth aspect, an embodiment of the present invention provides a terminal device, including a memory, a processor, and a transceiver.

The memory is configured to store a program that is read by the processor when the processor performs an operation.

The processor is configured to execute the program in the memory, to perform an operation of any method according to the eleventh aspect.

The transceiver is configured to receive and send data under control of the processor.

According to a fourteenth aspect, an embodiment of the present invention provides a network device, including a memory, a processor, and a transceiver.

The memory is configured to store a program that is read by the processor when the processor performs an operation.

The processor is configured to execute the program in the memory, to perform an operation of any method according to the twelfth aspect.

The transceiver is configured to receive and send data under control of the processor.

According to a fifteenth aspect, an embodiment of the present invention provides a system chip, where the system chip is applied to a terminal device, and the system chip includes an input/output interface, at least one processor, a memory, and a bus.

The input/output interface, the at least one processor, and the memory communicate with each other by using the bus, the memory stores a program instruction, the input/output interface is configured to receive and send data that needs to be transmitted, and the at least one processor invokes the program instruction stored in the memory, to perform an operation of any method according to the eleventh aspect.

According to a sixteenth aspect, an embodiment of the present invention provides a system chip, where the system chip is applied to a network device, and the system chip includes an input/output interface, at least one processor, a memory, and a bus.

The input/output interface, the at least one processor, and the memory communicate with each other by using the bus, the memory stores a program instruction, the input/output interface is configured to receive and send data that needs to be transmitted, and the at least one processor invokes the program instruction stored in the memory, to perform an operation of any method according to the twelfth aspect.

According to a seventeenth aspect, an embodiment of the present invention provides a computer program product, where the computer program product is applied to a terminal device, the computer program product includes an instruction, and when the instruction is performed by a computing apparatus, the terminal device performs an operation of any method according to the eleventh aspect.

According to an eighteenth aspect, an embodiment of the present invention provides a computer program product, where the computer program product is applied to a network device, the computer program product includes an instruction, and when the instruction is performed by a computing apparatus, the network device performs an operation of any method according to the twelfth aspect.

According to a nineteenth aspect, an embodiment of the present invention provides a computer readable storage medium, where the computer readable storage medium is applied to a terminal device, the computer readable storage medium includes an instruction, and when the instruction is performed by a computing apparatus, the terminal device performs an operation of any method according to the eleventh aspect.

According to a twelfth aspect, an embodiment of the present invention provides a computer readable storage medium, where the computer readable storage medium is applied to a network device, the computer readable storage medium includes an instruction, and when the instruction is performed by a computing apparatus, the network device performs an operation of any method according to the twelfth aspect.

According to a twenty-first aspect, an embodiment of the present invention provides a mobile communications system, and the system includes the terminal device according to the thirteenth aspect and/or the network device according to the fourteenth aspect.

DESCRIPTION OF EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The embodiments of the present invention provide a network slice selection method, a terminal device, and a network device, so that in a scenario in which one terminal device subscribes to a plurality of network slices, the network device can select a network slice for the terminal device. The method, the terminal device, and the network device are based on a same inventive concept. Because problem-resolving principles of the method, the terminal device, and the network device are similar, mutual reference may be made between implementation of the terminal device, the network device, and the method. No repeated description is provided.

A network slice is a set of logical network functional entities that support a specific communications service requirement, and mainly uses an SDN technology and an NFV technology. The NFV technology can implement a mapping from an underlying physical resource to a virtual resource, create a virtual machine, and load a network function (network function, NF). The SDN technology can implement a logical connection between virtual machines, and establish a path of bearer signaling and a path of a data flow. The network slice finally implements a dynamic connection between a RAN network functional entity and a CN network functional entity, and configures an end-to-end service chain, to implement flexible networking and a customizable network service. An operator may determine a network slice based on a requirement of each specific communications service for a key performance indicator (key performance indicator, KPI) such as a capacity, coverage, a rate, a latency, or reliability. A network slice includes a set of network functional entities and network resources required for running the network functional entities, to provide a user with a required telecommunications service and network capability service, and meet a specific market scenario and requirement.

Figure 1:
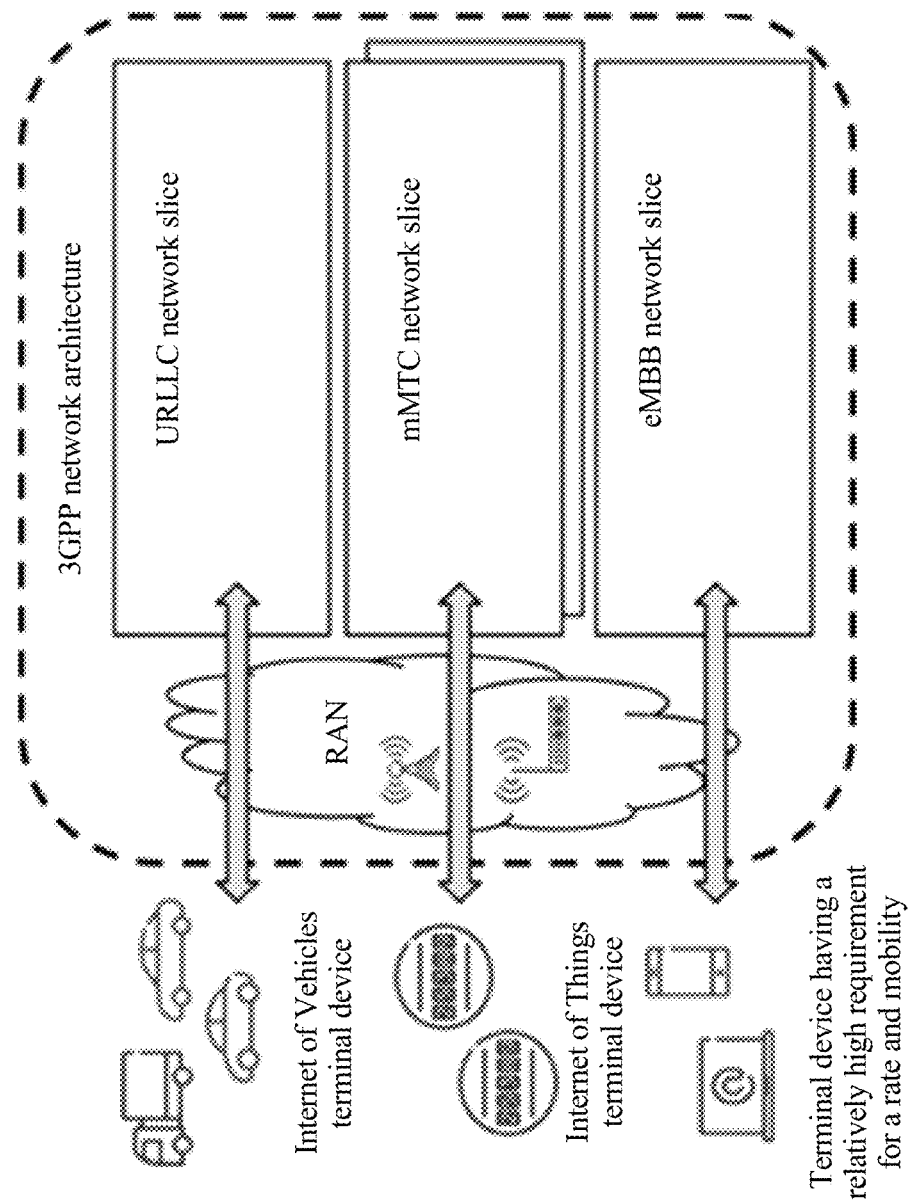
FIG. 1 is a schematic diagram of a 3GPP network framework that supports a plurality of network slices.

As shown in FIG. 1, FIG. 1 is a schematic diagram of a 3rd Generation Partnership Project (the third generation partnership project, 3GPP) network framework that supports a plurality of network slices. The 3GPP classifies 5G network slices into the following three main types: an enhanced mobile broadband (enhanced mobile broadband, eMBB) network slice, a massive machine type communication (massive machine type communication, mMTC) network slice, and an ultra-reliable and low latency communications (ultra-reliable and low latency communications, URLLC) network slice. The eMBB network slice is mainly oriented to a terminal device having a relatively high requirement for a rate and mobility, for example, a mobile phone or a multimedia device. The mMTC network slice is mainly oriented to an Internet of Things terminal device, and the terminal device has a requirement for a large scale, low mobility, and a relatively low rate. The URLLC network slice is mainly oriented to an Internet of Vehicles terminal device, and the terminal device has a relatively high requirement for a latency and reliability. For example, a mobile phone may access the eMBB network slice, to perform high-speed downloading or watch a 4K high-definition video. A sensor device may access the mMTC network slice, to transmit a small data packet and update a system configuration.

Currently, one terminal device is allowed to access one or more network slices, so that the terminal device can support a plurality of communications services, and user experience can be improved. The technical solutions provided in the embodiments of the present invention may be applied to a scenario in which one terminal device accesses one or more network slices.

Figure 2:
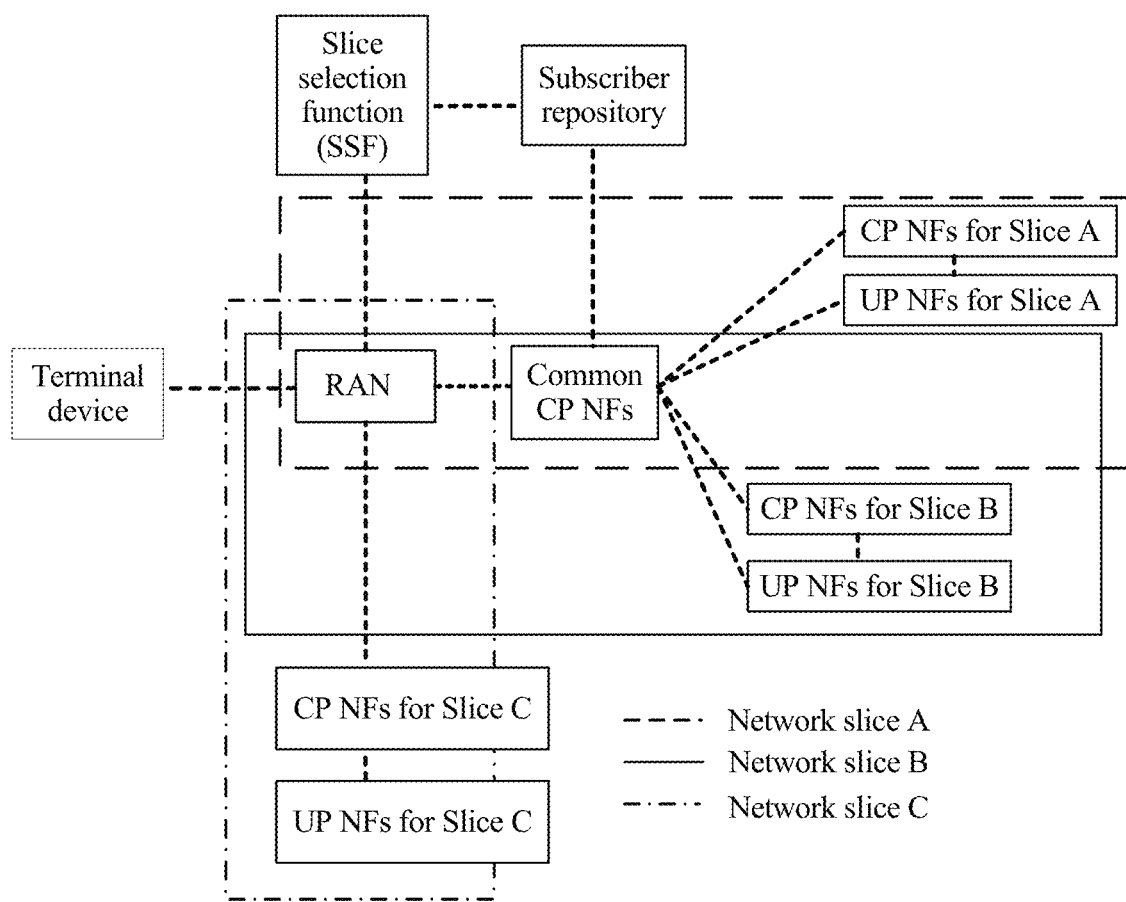
FIG. 2 is a schematic diagram of a system framework according to an embodiment of the present invention.

The embodiments of the present invention may be applied to a further evolved system of a 5G system or an LTE system. For example, a system framework shown in FIG. 2 may be used. The system framework mainly involves a terminal device, a RAN, a slice selection function (slice selection function, SSF) entity, a subscriber repository (subscriber repository), a control plane network function (CP NF) entity, a user plane network function (UP NF) entity, and the like. The embodiments of the present invention mainly provide a method for selecting a network slice by a network device for the terminal device.

The terminal device in the embodiments of the present invention may be a device that provides a user with voice and/or data connectivity, a handheld device with a radio connection function, or another processing device connected to a wireless modem. A wireless terminal device may communicate with one or more core networks by using the RAN. The wireless terminal device may be a mobile terminal device such as a mobile phone (or referred to as a "cellular" phone), or a computer with a mobile terminal device, for example, a portable, pocket-sized, handheld, computer built-in, or in-vehicle mobile apparatus that exchanges voice and/or data with the radio access network. For example, the wireless terminal device may be a device such as a personal communications service (Personal Communication Service, PCS) phone, a cordless phone, a Session Initiation Protocol (Session Initiated Protocol, SIP) phone, a wireless local loop (Wireless Local Loop, WLL) station, or a personal digital assistant (Personal Digital Assistant, PDA). The wireless terminal device may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal) device, an access terminal (Access Terminal) device, a user terminal (User Terminal) device, a user agent (User Agent), a user device (User Device), or user equipment (User Equipment). This is not limited in the embodiments of the present invention. Based on a service type, the terminal device in the embodiments of the present invention may be the foregoing terminal device having a relatively high requirement for a rate and mobility, for example, a mobile phone or a multimedia device, or may be the foregoing Internet of Things terminal device, or may be the foregoing Internet of Vehicles terminal device.

The network device in the embodiments of the present invention may be a RAN device or a CN device, and is mainly configured to select a network slice for the terminal device. To be specific, the network device allocates a network slice identifier to the terminal device. The network device may be an access point, or may be a device that is in an access network and communicates, over an air interface, with the wireless terminal device by using one or more sectors. The network device may be configured to perform mutual conversion between a received over-the-air frame and a received Internet Protocol (Internet Protocol, IP) packet, and serves as a router between the wireless terminal device and a rest part of the access network. The rest part of the access network may include an Internet Protocol (IP) network. The network device may further coordinate attribute management of the air interface. For example, the network device may be a network device (BTS, Base Transceiver Station) in a Global System for Mobile Communications (Global System for Mobile Communications, GSM) or Code Division Multiple Access (Code Division Multiple Access, CDMA), or may be a network device (NodeB) in Wideband Code Division Multiple Access (Wide-band Code Division Multiple Access, WCDMA), or may be an evolved network device (evolutional Node B, eNB, or e-NodeB) in LTE. This is not limited in the embodiments of the present invention.

The following describes in detail the technical solutions provided in the embodiments of the present invention by using specific embodiments. It should be noted that the presentation order of the embodiments represents only a sequence of the embodiments, and does not represent that a technical solution provided in an embodiment is better than that in another embodiment.

Embodiment 1

Figure 3:
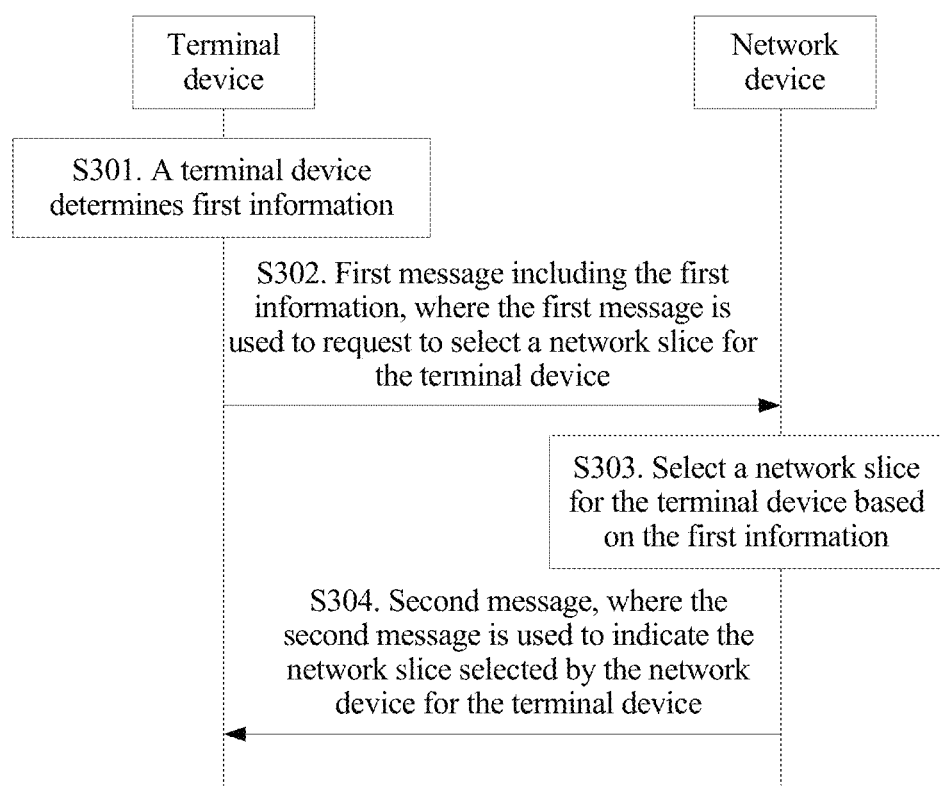
FIG. 3 is a schematic flowchart of a network slice selection method according to an embodiment of the present invention.

As shown in FIG. 3, an embodiment of the present invention provides a network slice selection method, including the following steps.

S301. A terminal device generates first information, where the first information includes any one or any combination of the following: information about a first network slice, first service information, and access information of the terminal device.

The first information may be used by a network device to select a network slice for the terminal device. The information about the first network slice is used to indicate a network slice, and the information about the first network slice may be a network slice identifier, network slice feature information, or the like. For example, the information about the first network slice may include a tenant (Tenant) identifier corresponding to a network slice and a network slice that supports a service type. The network slice that supports a service type may be an eMBB network slice, a URLLC network slice, or the like.

Optionally, the information about the first network slice may further include a user identifier, a network functional entity identifier, a public land mobile network (Public Land Mobile Network, PLMN) identifier selected by the terminal device, and the like. For example, the user identifier may be an international mobile subscriber identity (International Mobile Subscriber Identification Number, IMSI), a globally unique temporary user equipment identity (Globally Unique Temporary UE Identity, GUTI), or the like.

Optionally, the first service information is used to indicate a service initiated by the terminal device. For example, the first service information may be a service application identifier, a flow identifier, a data packet identifier, a tunnel identifier, a radio bearer identifier, a service type (Service Type), a user usage type (UE Usage Type), an access point name (Access Point Name, APN) address, an APN identifier, or the like.

The first service information is defined in a standard, and is briefly described below.

Service application identifier: The service application identifier is an application layer identifier used to uniquely determine a specific service, for example, used to indicate a WeChat service, a virtual reality service, an in-vehicle service, or the like. One network slice may carry one or one type of service. Therefore, there is a mapping relationship between a service application identifier and a network slice. The first service information may include a service application identifier.

Flow identifier: The flow identifier is an identifier used to uniquely determine a carried service flow (flow). For example, an identifier of a service flow is added in a process of establishing the service flow. One network slice may carry one or one type of service flow. Therefore, there is a mapping relationship between a flow identifier and a network slice. The first service information may include a flow identifier.

Data packet identifier: The data packet identifier is used to uniquely indicate a data packet type, for example, may indicate that a data packet belongs to a service or a network slice. Therefore, there is a mapping relationship between a data packet identifier and a service, and there is a mapping relationship between a data packet identifier and a network slice. The first service information may include a data packet identifier.

Tunnel identifier: The tunnel identifier is used to uniquely indicate an identifier of a tunnel (Tunnel) established by the network device for the terminal device. The tunnel is used to transmit specific data for the terminal device between a core network device and an access network device. For example, one tunnel or a group of tunnels are established for a network slice. Therefore, there is a mapping relationship between a tunnel identifier and a network slice. The first service information may include a tunnel identifier.

Radio bearer identifier: The radio bearer identifier is an identifier used to uniquely determine a bearer (Radio Bearer, RB) established by a network side device for a terminal. The bearer may be a signaling bearer (Signaling RB, SRB), a data bearer (Data RB, DRB), or the like. The bearer is used by the access network device to transmit specific data for the terminal. For example, one bearer or a group of bearers are established for a network slice, and different network slices may use different bearers. Therefore, there is a mapping relationship between a radio bearer identifier and a network slice. The first service information may include a radio bearer identifier.

Service type: The service type is an identifier used to uniquely determine a service type, for example, used to indicate a service type such as an eMBB service, a URLLC service, and an mMTC service. One network slice may be corresponding to one service type. Therefore, there is a mapping relationship between a service type and a network slice. The first service information may include a service type.

User usage type: The user usage type is a type identifier used to uniquely determine a terminal device used by a user, for example, an mMTC-specific terminal device, a terminal device specific to an in-vehicle service, and the like. The mMTC-specific terminal device, such as a sensor, can perform only an mMTC service. For example, the user usage type indicates a network standard access capability of the terminal device. For example, a mobile device in an LTE network can perform only an LTE network service, or a mobile device in a 5G network can perform only a 5G network service. Therefore, there is a mapping relationship between a user usage type and a service type, and there is a mapping relationship between a service type and a network slice. The first service information may include a user usage type.

Access point address or access point identifier: The access point address or the access point identifier is used to uniquely determine an access manner in which the user accesses a network, and is a parameter that needs to be configured when the user accesses the network. The user may access many types of networks, such as a public Internet, an enterprise network, and an emergency call network. The access point address or the access point identifier may uniquely determine a type of a network accessed by the user. A network slice may have a corresponding access point address or access point identifier. Therefore, there is a mapping relationship between an access point address and a network slice, and there is a mapping relationship between an access point identifier and a network slice. The first service information may include an access point address or an access point identifier.

When the first service information generated by the terminal device includes any one or any combination of the foregoing information, after receiving the first service information, the network device may select a network slice for the terminal device based on a mapping relationship between the foregoing information included in the first service information and a network slice.

Optionally, the access information of the terminal device may be a level of the terminal device, a random access channel (Random Access Channel, RACH) channel type, a random access preamble sequence, or the like. The access information of the terminal device is defined in a standard, and is briefly described below.

RACH channel type: The RACH channel type is used to indicate a specific location of time domain and frequency domain resource of a specific air interface on which the terminal device initiates a random access request. One or more network slices may be corresponding to one dedicated RACH channel or a group of dedicated RACH channels. For example, a specific RACH channel is configured for an mMTC-specific terminal device. When the mMTC-specific terminal device initiates access, the network device may identify a device type of the terminal device, and therefore select an mMTC-specific network slice for the terminal device. The RACH channel type may implicitly include network slice identifier information. Certainly, the access information of the terminal device may also carry an RACH channel type.

Random access preamble: The random access preamble is used to indicate an orthogonal sequence signal used when the terminal device initiates random access. One or more network slices may be corresponding to one dedicated random access preamble or a group of dedicated random access preambles. For example, a specific random access preamble is configured for an mMTC-specific terminal device. When the mMTC-specific terminal device initiates access, the network side device may identify a device type of the terminal device, and therefore selects an mMTC-specific network slice for the terminal device. The random access preamble may implicitly include network slice identifier information. Certainly, the access information of the terminal device may also carry a random access preamble.

Optionally, when the first information includes the information about the first network slice, the terminal device may generate the information about the first network slice by using one of the following methods.

When the terminal device has preconfigured an identifier of a unique network slice, the terminal device uses the unique network slice identifier as the information about the first network slice.

The terminal device selects a network slice identifier of a network slice with a highest priority as the information about the first network slice. Priorities of different network slices may be delivered by the network device to the terminal device. For example, when the terminal device has preconfigured at least two network slice identifiers, the terminal device selects a network slice identifier of a network slice with a highest priority from the preconfigured at least two network slice identifiers as the information about the first network slice based on a network slice priority.

The terminal device may preconfigure a network slice identifier in a universal subscriber identity module (universal subscriber identity module, USIM) card.

The terminal device uses, as the information about the first network slice, a network slice identifier of a network slice corresponding to a service initiated by the terminal device. For example, when the terminal device has preconfigured at least two network slice identifiers, the terminal device uses, as the information about the first network slice based on a service initiated by the terminal device and a mapping relationship between a service and a network slice, a network slice identifier of a network slice corresponding to the service initiated by the terminal device. For another example, when the terminal device preconfigures no network slice identifier, the terminal device uses, as the information about the first network slice based on a service initiated by the terminal device and a mapping relationship between a service and a network slice, a network slice identifier of a network slice corresponding to the service initiated by the terminal device.

The mapping relationship between a service and a network slice may be delivered by the network device to the terminal device. For example, the network device may notify the terminal device of the mapping relationship between a service and a network slice by using a radio resource control (Radio Resource Control, RRC) message, a non-access stratum (Non-access Stratum, NAS) message, or a medium access control (Medium Access Control, MAC) layer message.

S302. The terminal device sends a first message including the first information to a network device, where the first message is used to request to select a network slice for the terminal device.

The first message is an air interface message, for example, may be a radio resource control connection request (Radio Resource Control Connection Request, RRC Connection Request) message, an RRC connection reestablishment request (RRC Connection Reestablishment Request) message, an RRC connection reconfiguration complete (RRC Connection Reconfiguration Complete) message, a NAS attach request (Attach Request) message, a NAS service request (Service Request) message, a MAC layer message, or the like.

By using the method in which the terminal device generates the information about the first network slice in S301, and the terminal device sends the generated information about the first network slice to the network device in S302, the prior-art problem that a network device cannot select a network slice for a terminal device and that is caused by another reason can be resolved.

In another network slice selection technology solution in the prior art, a terminal device preconfigures a network slice identifier, the terminal device reports one network slice identifier to a network device, and the network device selects, for the terminal device, a network slice indicated by the network slice identifier. This existing solution is applicable to a scenario in which the terminal device has preconfigured a single network slice identifier. When the terminal device has preconfigured a plurality of network slice identifiers, the terminal device cannot select a network slice identifier to be reported to the network device. Consequently, the network device cannot select a suitable network slice for the terminal device.

However, in this embodiment, the terminal device can report a network slice identifier to the network device when the terminal device has preconfigured one or more network slice identifiers, or preconfigures no network slice identifier. This overcomes the foregoing prior-art problem.

S303. The network device selects a network slice for the terminal device based on the first information.

Optionally, the network device may select a network slice for the terminal device by using one of the following methods:

When the first information includes the information about the first network slice, the network device uses a network slice indicated by the information about the first network slice as the network slice selected for the terminal device.

When the first information includes the first service information, the network device uses, based on a service indicated by the first service information and a mapping relationship between a service and a network slice, a network slice corresponding to the service indicated by the first service information as the network slice selected for the terminal device.

When the first information includes the access information of the terminal device, the network device selects the network slice for the terminal device based on the access information of the terminal device.

For example, when the access information of the terminal device is a level of the terminal device, the network device may select, as the network slice selected for the terminal device, a network slice suitable for the level of the terminal device based on the level of the terminal device and a preconfigured mapping relationship between a level of the terminal device and a network slice. When the access information of the terminal device is a RACH channel type, the network device may select, as the network slice selected for the terminal device, a network slice suitable for the RACH channel type based on the RACH channel type and a preconfigured mapping relationship between a RACH channel type and a network slice. When the access information of the terminal device is a random access preamble sequence, because different network slices are corresponding to different random access preamble sequences, the network device may identify a network slice corresponding to the random access preamble sequence, and use the network slice as the network slice selected for the terminal device.

It should be noted that when the terminal device does not send the first information to the network device, the network device may not select a network slice for the terminal device, or the network device may select a network slice for the terminal device based on factors such as a network slice priority, network slice load, a network topology, and a radio access type (Radio Access Type, RAT) of terminal access.

S304. The network device sends a second message to the terminal device, where the second message is used to indicate the network slice selected by the network device for the terminal device.

After receiving the second message, the terminal device stores information that is used to indicate the network slice selected by the network device for the terminal device. For example, the terminal device stores an identifier of the network slice selected by the network device for the terminal device.

The second message may include information such as a network slice identifier, a globally unique temporary identity (Globally Unique Temporary Identity, GUTI), a network functional entity identifier, and network slice feature information, for example, a tenant (Tenant) identifier corresponding to a network slice, a network slice that supports a service type, or some or all service information supported by a network slice. The network slice that supports a service type may be an eMBB network slice, a URLLC network slice, or the like. The some or all service information supported by a network slice may be an application identifier, a flow identifier, a data packet identifier, a tunnel identifier, a radio bearer identifier, a service type, a UE usage type, an APN address, an APN identifier, or the like.

Optionally, the second message may carry a network slice identifier, network slice feature information, and the like, to indicate the network slice selected by the network device for the terminal device. For example, the second message may carry an identifier, a frequency, bandwidth, air interface resource configuration, an access control configuration, and the like of a cell in which the network slice is located.

For example, the second message may carry a cell in which the network slice is located. When the cell in which the network slice is located and that is carried in the second message is not a cell accessed by the terminal device, the terminal device may re-initiate network access based on the cell in which the network slice is located and that is indicated by the second message.

It should be noted that if the network slice that is selected by the network device for the terminal device and that is indicated by the second message is different from the network slice indicated by the information about the first network slice that is generated by the terminal device, the network device that is selected by the network device for the terminal device and that is indicated by the second message is selected. The second message is an air interface message, for example, may be an RRC connection setup (RRC Connection Setup) message, an RRC connection reestablishment (RRC Connection Reestablishment) message, an RRC connection reconfiguration (RRC Connection Reconfiguration) message, a NAS attach response (Attach Response) message, a NAS attach accept (Attach Accept) message, a NAS service response (Service Response) message, a NAS Service Accept (Service Accept) message, a MAC layer message, or the like.

Because different network slices are corresponding to different random access preamble sequences, the network slice may be indicated by using a random access preamble sequence instead of the network slice identifier in the foregoing method.

By using the foregoing method in this embodiment, the network device can select a network slice for the terminal device. The prior-art problem that in a scenario in which one terminal device subscribes to a plurality of network slices, a network device cannot select a suitable network slice for the terminal device based on only subscription information of the terminal device is resolved by using the foregoing method in this embodiment.

In the network slice selection method provided in the embodiments, the network device may be a RAN device. In the prior art, because a network slice selection function (slice selection function, SSF) module exists in a core network, when the RAN device selects a network slice for the terminal device, network slice selection can be completed only after the RAN device exchanges a plurality of pieces of signaling with the CN, resulting in relatively large signaling overheads and a relatively long network slice access latency. According to the network slice selection method provided in the embodiments, the RAN device can select a network slice for the terminal device, and the RAN device does not need to exchange a plurality of pieces of signaling with the CN. This overcomes the prior-art problem of large signaling overheads and a long network slice access latency.

Figure 4:
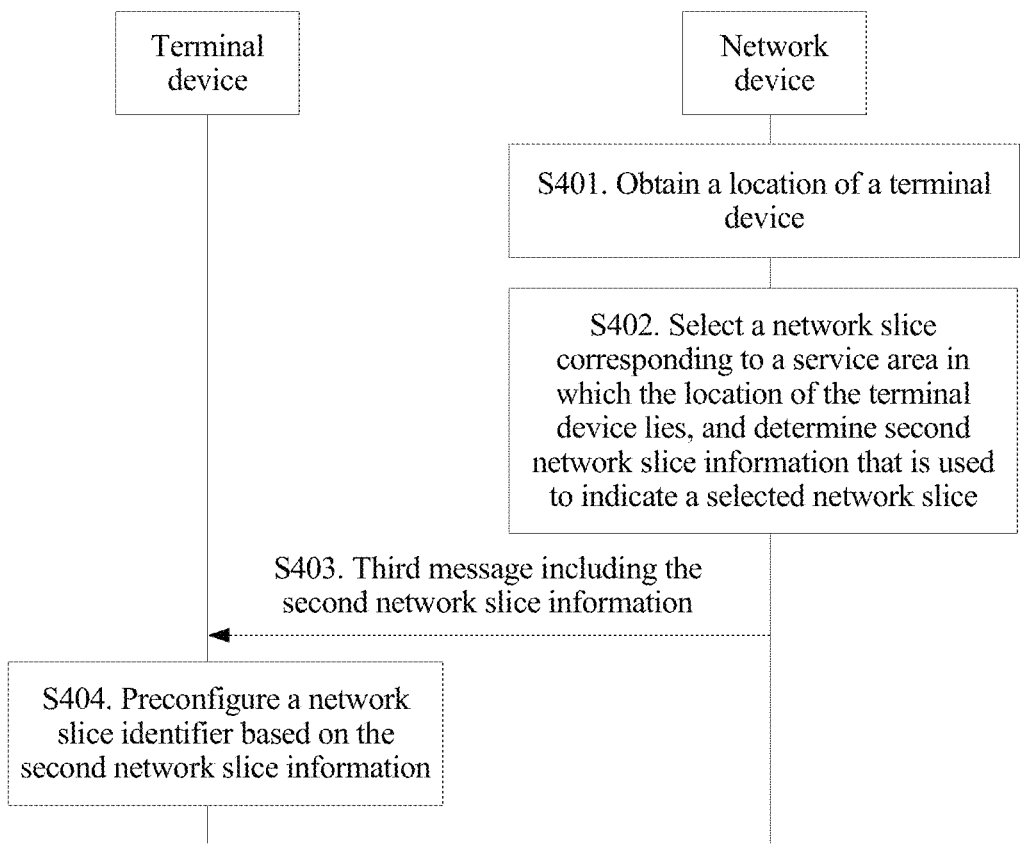
FIG. 4 is a schematic flowchart of a network slice discovery method according to an embodiment of the present invention.

Optionally, the embodiments further provide a network slice discovery method. Before the terminal device generates the information about the first network slice in S301, the terminal device may preconfigure a network slice identifier by using the method. As shown in FIG. 4, an embodiment further provides a network slice discovery method, including the following steps.

S401. A network device obtains a location of a terminal device.

Optionally, the network device may receive the location of the terminal device that is reported by the terminal device, or the network device may obtain the location of the terminal device through measurement.

S402. The network device selects a network slice corresponding to a service area in which the location of the terminal device lies, and determines second network slice information that is used to indicate the selected network slice.

Different network slices may cover different service areas, and the network device may find, based on the location of the terminal device, a network slice suitable for the location of the terminal device.

The second network slice information is used to indicate a network slice. The second network slice information may include information such as a network slice identifier and network slice feature information, for example, a tenant (Tenant) identifier corresponding to a network slice, a network slice that supports a service type, or some or all service information supported by a network slice. The network slice that supports a service type may be an eMBB network slice, a URLLC network slice, or the like. The some or all service information supported by a network slice may be an application identifier, a flow identifier, a data packet identifier, a tunnel identifier, a radio bearer identifier, a service type, a UE usage type, an APN address, an APN identifier, or the like.

Optionally, a second network slice information may carry a network slice identifier, network slice feature information, or the like, to indicate the network slice selected by the network device for the terminal device. For example, the second message may carry an identifier, a frequency, bandwidth, air interface resource cooperation, a protocol stack configuration, an access control configuration, and the like of a cell in which the network slice is located.

S403. The network device sends a third message including the second network slice information to the terminal device.

The third message is an air interface message, for example, may be an RRC system information block (System Information Block, SIB) message, an RRC connection setup message, an RRC connection reconfiguration message, a NAS attach response (Attach Response) message, a NAS service response (Service Response) message, a MAC layer message, or the like.

The network device may send the third message to the terminal device in a broadcast, multicast, or unicast manner by using an RRC message, a NAS message, or a MAC message.

S404. The terminal device preconfigures a network slice identifier based on the second network slice information.

Optionally, before S402, the terminal device may report, to the network device, information about a network slice in which the terminal device is interested and/or information about a service initiated by the terminal device, for example, a network slice identifier and/or a service identifier. In this case, the network device may determine the second network slice information based on both the location of the terminal device and the information reported by the terminal device in S402. A specific method is as follows:

When the terminal device reports, to the network device, the information about the network slice in which the terminal device is interested, and the location of the terminal device is in or near a service area corresponding to the reported information about the network slice, the network device uses, as the second network slice information, the information about the network slice in which the terminal device is interested that is reported by the terminal device.

When the terminal device reports, to the network device, the information about the service initiated by the terminal device, and the location of the terminal device is in or near a service area corresponding to the reported information about the service, the network device uses, as the second network slice information, information about a network slice corresponding to the reported information that is about the service and that is reported by the terminal device. Different network slices may cover different service areas, and different network slices may support different services.

According to the network slice discovery method provided in this embodiment, the network device may recommend a network slice to the terminal device based on the location of the terminal device, the information about the network slice in which the terminal device is interested that is reported by the terminal device, and the information about the service initiated by the terminal device, so that the terminal device discovers and preconfigures the network slice. In this way, the terminal device may initiate a targeted network slice selection request for a network slice corresponding to a specific service area, to avoid a problem of a network slice selection failure caused when the terminal device blindly initiates a network slice selection request.

Optionally, the embodiments further provide two network slice access barring check methods. Before the terminal device generates the information about the first network slice in S301, the terminal device may determine, by using the methods, whether a preconfigured network slice can be accessed.

Figure 5:
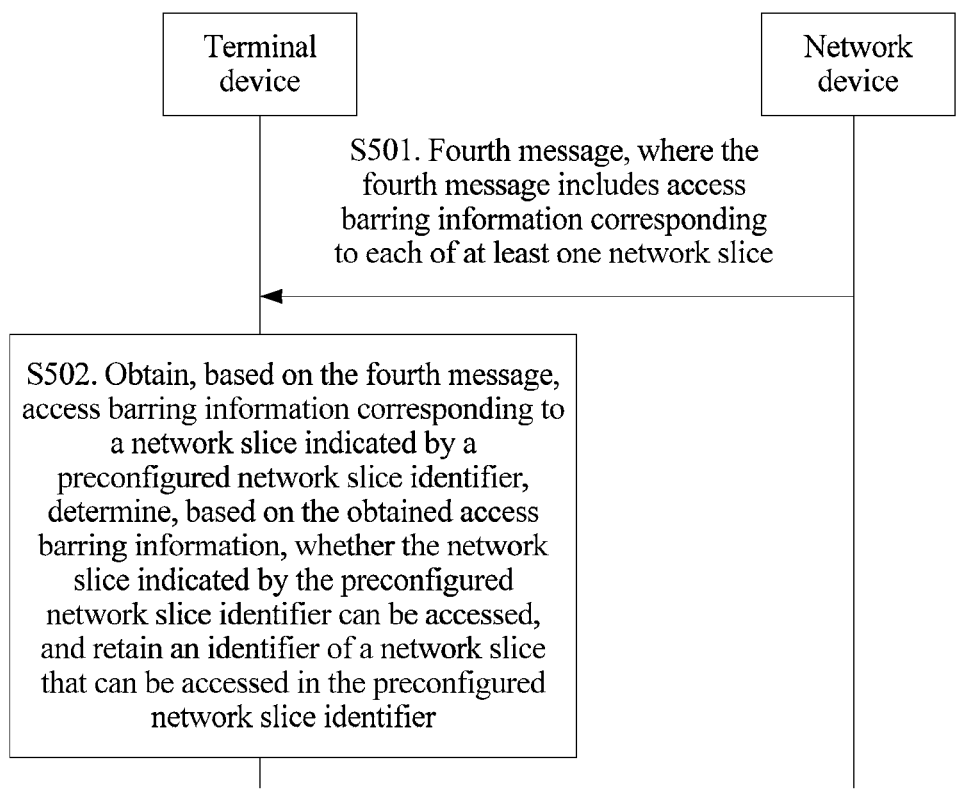
FIG. 5 is a schematic flowchart of a network slice access barring check method according to an embodiment of the present invention.

As shown in FIG. 5, a network slice access barring check method provided in an embodiment includes the following steps.

S501. A network device sends a fourth message to a terminal device, where the fourth message includes access barring information corresponding to each of at least one network slice.

The fourth message is an air interface message, for example, may be an RRC system information block (System Information Block, SIB) message, an RRC connection setup message, an RRC connection reconfiguration message, a NAS attach response (Attach Response) message, a NAS service response (Service Response) message, a MAC layer message, or the like. The fourth message may be sent to the terminal device in a broadcast, multicast, or unicast manner.

The access barring information corresponding to the network slice includes but is not limited to an access barring time (access barring time) and an access barring factor (access barring factor). The access barring information corresponding to the network slice may exist in a form of a list.

It should be noted that the fourth message and the foregoing third message may be a same message, or may be different messages. The fourth message and the third message may be synchronously sent or may not be synchronously sent.

It should be noted that the access barring information corresponding to each of the at least one network slice that is included in the fourth message may be in a plurality of representation forms. For example, network slices may be classified into different types based on attributes of the network slices. Each network slice type may include one or more network slices, and each network slice type is corresponding to one piece of access barring information. For another example, network slices are randomly grouped. Each group of network slices may include one or more network slices, and each group of network slices is corresponding to one piece of access barring information.

S502. The terminal device learns of, based on the fourth message, access barring information corresponding to a network slice indicated by a preconfigured network slice identifier, identifies a network slice that can be accessed in the network slice indicated by the preconfigured network slice identifier, and retains an identifier of the network slice that can be accessed.

For example, after learning of the access barring information corresponding to the network slice indicated by the preconfigured network slice identifier, the terminal device determines whether the network slice indicated by the preconfigured network slice identifier can be accessed:

An access barring timer is set for each network slice. When an access barring timer that is set for a network slice is running, the terminal device determines that the network slice cannot be accessed.

When the access barring timer configured for the network slice is not running, the terminal device selects one of even-distributed random numbers between 0 and 1 by using a random number algorithm, and if the random number is less than an access barring factor corresponding to the network slice, the terminal device determines that the network slice can be accessed. If the random number is greater than or equal to an access barring factor corresponding to the network slice, the terminal device determines that the network slice cannot be accessed, and the terminal device starts the access barring timer corresponding to the network slice. A timing length of the access barring timer is (0.7+0.6*random number)*access barring time.

Figure 6:
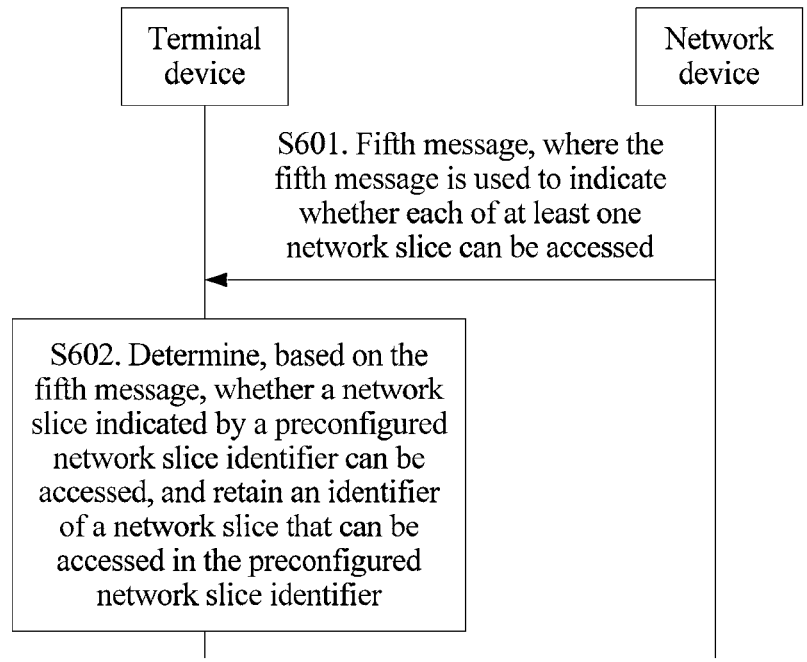
FIG. 6 is a schematic flowchart of another network slice access barring check method according to an embodiment of the present invention.

As shown in FIG. 6, another network slice access barring check method provided in an embodiment includes the following steps.

S601: A network device sends a fifth message to a terminal device, where the fifth message is used to indicate a network slice that can be accessed in at least one network slice.

The fifth message is an air interface message, for example, may be an RRC system information block (System Information Block, SIB) message, an RRC connection setup message, an RRC connection reconfiguration message, a NAS attach response (Attach Response) message, a NAS service response (Service Response) message, a MAC layer message, or the like.

The network device may send the fifth message to the terminal device in a broadcast or multicast manner. For example, the fifth message indicates a network slice that can be accessed in network slices of different levels, and may indicate the network slice that can be accessed in the network slices of different levels by using a network slice access level map. For example, in the network slice access level map, "0" indicates that a network slice of a corresponding level can be accessed, and "1" indicates that a network slice of a corresponding level cannot be accessed. The fifth message may further indicate a network access rejection reason, for example, indicate an identifier of a network slice that refuses to be accessed. The fifth message may further indicate a network slice backoff time. The terminal device needs to wait for a period of the backoff time to re-initiate network slice access.

S602. The terminal device identifies, based on the fifth message, a network slice that can be accessed in a network slice indicated by a preconfigured network slice identifier, and retains an identifier of the network slice that can be accessed.

For example, after learning of the network slice access level map, the terminal device determines whether the network slice indicated by the preconfigured network slice identifier can be accessed:

The terminal device learns of a level of the network slice. The terminal device may store levels of different network slices in a USIM card, or may receive a message that is used to indicate levels of different network slices and that is sent by the network device. The message used to indicate the levels of the different network slices may be an air interface message, for example, an RRC connection reconfiguration message.

The terminal device searches a map of network slice access level(s) based on the level of the network slice, to determine whether the network slice can be accessed.

Further, after whether a preconfigured network slice can be accessed is determined by using the foregoing two methods, the preconfigured network slice may be processed based on a determining result. For a network slice that cannot be accessed, the terminal device may delete, from the preconfigured network slice identifier, a network slice identifier corresponding to the network slice that cannot be accessed, and the terminal device does not initiate a network slice selection request to the network device subsequently for the network slice that cannot be accessed. For a network slice that can be accessed, the terminal device retains a preconfigured network slice identifier corresponding to the network slice, and the terminal device may initiate a network slice selection request to the network device subsequently for the network slice that can be accessed.

In the foregoing two methods, the network device notifies, based on load statuses of different network slices, the terminal device whether the different network slices can be accessed, to implement access control on the network slices based on the load statuses of the network slices.

Figure 7:
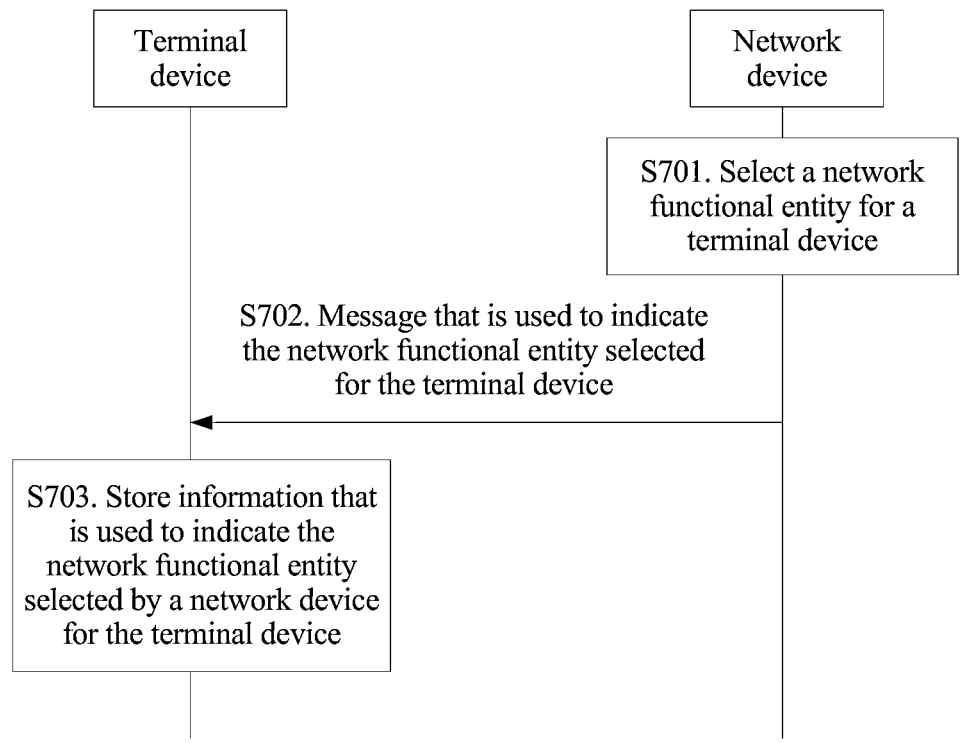
FIG. 7 is a schematic flowchart of a network functional entity selection method according to an embodiment of the present invention.

Optionally, the embodiments further provide a network functional entity selection method. After a network device selects a network slice for a terminal device, the network device may select a network functional entity for the terminal device by using the method. As shown in FIG. 7, an embodiment further provides a network functional entity selection method, including the following steps.

S701. A network device selects a network functional entity for a terminal device.

When the first message in S302 further includes a network functional entity identifier, or another message sent by the terminal device to the network device includes a network functional entity identifier, the network device uses, as the network functional entity selected for the terminal device, a network functional entity indicated by the network functional entity identifier.

When the terminal device does not notify the network device of a network functional entity, or the network device cannot correctly address a network functional entity based on a network functional entity identifier sent by the terminal device, the network device may select, from a network functional entity connected to the network device based on any one or any combination of information about a first network slice, first service information, and access information of the terminal device that are carried in first information, a network functional entity that supports the network slice selected for the terminal device, and use the selected network functional entity as the network functional entity selected for the terminal device. For example, the information about the first network slice may be a network slice identifier, a network slice type, or the like.

When the network device selects a network functional entity for the terminal device, factors such as load of a network functional entity, a network topology, and a RAT of terminal access may also be considered.

S702. The network device sends, to the terminal device, a message used to indicate the network functional entity selected for the terminal device.

S703. The terminal device stores information that is used to indicate the network functional entity selected by the network device for the terminal device.

For example, the terminal device stores an identifier of the network functional entity selected by the network device for the terminal device.

The network functional entity includes a user plane (User Plane, UP) network functional entity and a control plane (Control Plane, CP) network functional entity.

In the prior art, a network slice selection process and a network functional entity selection process are separately performed. As a result, the terminal device needs to establish an RRC connection two times to connect to a network functional entity and to initiate and establish a service. According to the method provided in this embodiment, the network device may select a network functional entity for the terminal device, and the terminal device can connect to the network functional entity without establishing the RRC connection two times.

In the foregoing technical solutions provided in the embodiments of the present invention, the network device selects the network slice for the terminal device based on the first information sent by the terminal device, and notifies the terminal device of the network slice selected by the network device for the terminal device. The first information includes any one or any combination of the following: the information about the first network slice, the first service information, and the access information of the terminal device. Therefore, according to the technical solutions provided in the embodiments of the present invention, the network device can select a network slice for the terminal device. The prior-art problem that in a scenario in which one terminal device subscribes to a plurality of network slices, a network device cannot select a suitable network slice for the terminal device based on only subscription information of the terminal device can be resolved by using the technical solutions provided in the embodiments of the present invention.

Embodiment 2

Figure 8:
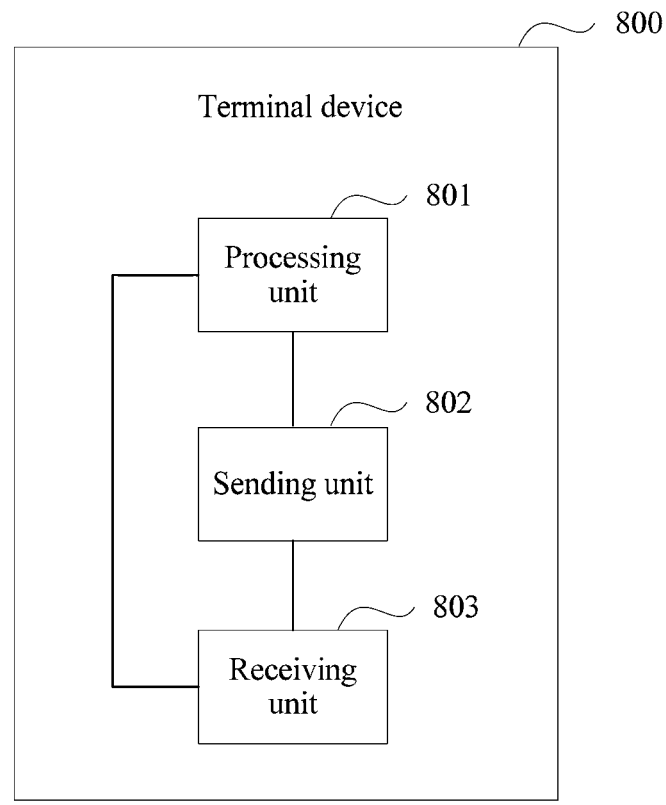
FIG. 8 is a schematic structural diagram of a terminal device according to an embodiment of the present invention.

Based on a same inventive concept, an embodiment of the present invention further provides a terminal device. The terminal device may perform a terminal device side method in the method provided in Embodiment 1. Referring to FIG. 8, a terminal device 800 includes a processing unit 801, a sending unit 802, and a receiving unit 803.

The processing unit 801 is configured to generate first information, where the first information includes any one or any combination of the following: information about a first network slice, first service information, and access information of the terminal device 800.

The sending unit 802 is configured to send, to a network device, a first message including the first information generated by the processing unit 801, where the first message is used to request to select a network slice for the terminal device 800.

The receiving unit 803 is configured to receive a second message sent by the network device, where the second message is used to indicate a network slice selected by the network device for the terminal device 800.

Optionally, when the first information includes the information about the first network slice, and the processing unit 801 generates the information about the first network slice, the processing unit 801 is specifically configured to:

when the terminal device 800 has preconfigured an identifier of a unique network slice, use the unique network slice identifier as the information about the first network slice; or select a network slice identifier of a network slice with a highest priority as the information about the first network slice; or use, as the information about the first network slice, a network slice identifier of a network slice corresponding to a service initiated by the terminal device 800.

Optionally, the first service information includes any one or any combination of the following: a service application identifier, a flow identifier, a data packet identifier, a tunnel identifier, a radio bearer identifier, a service type, a user usage type, an access point address, and an access point identifier.

Optionally, the access information of the terminal device 800 includes any one or any combination of the following:

a level of the terminal device 800, a random access channel RACH channel type, and a random access preamble sequence.

Optionally, when the terminal device 800 has preconfigured a network slice identifier, the receiving unit 803 is further configured to:

before the processing unit 801 generates the information about the first network slice, receive a third message that is sent by the network device and that includes second network slice information, where the second network slice information is used to indicate a network slice selected by the network device based on a location of the terminal device 800; and the processing unit 801 is further configured to:

preconfigure the network slice identifier based on the second network slice information received by the receiving unit 803.

Optionally, when the terminal device 800 has preconfigured a network slice identifier, the receiving unit 803 is further configured to:

before the processing unit 801 generates the information about the first network slice, receive a fourth message sent by the network device, where the fourth message includes access barring information corresponding to each of at least one network slice; and the processing unit 801 is further configured to:

learn of, based on the fourth message received by the receiving unit 803, access barring information corresponding to a network slice indicated by the preconfigured network slice identifier, identify a network slice that can be accessed in the network slice indicated by the preconfigured network slice identifier, and retain an identifier of the network slice that can be accessed.

Optionally, when the terminal device 800 has preconfigured a network slice identifier, the receiving unit 803 is further configured to:

before the processing unit 801 generates the information about the first network slice, receive a fifth message sent by the network device, where the fifth message is used to indicate a network slice that can be accessed in at least one network slice; and the processing unit 801 is further configured to:

learn of, based on the fifth message received by the receiving unit 803, a network slice that can be accessed in a network slice indicated by the preconfigured network slice identifier, and retain an identifier of the network slice that can be accessed.

Optionally, the first message further includes a network functional entity identifier.

It should be noted that the unit division in the embodiments of the present invention is an example, and is only logical function division. There may be another division manner in actual implementation. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor (processor) to perform all or some steps of the methods in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Figure 9:
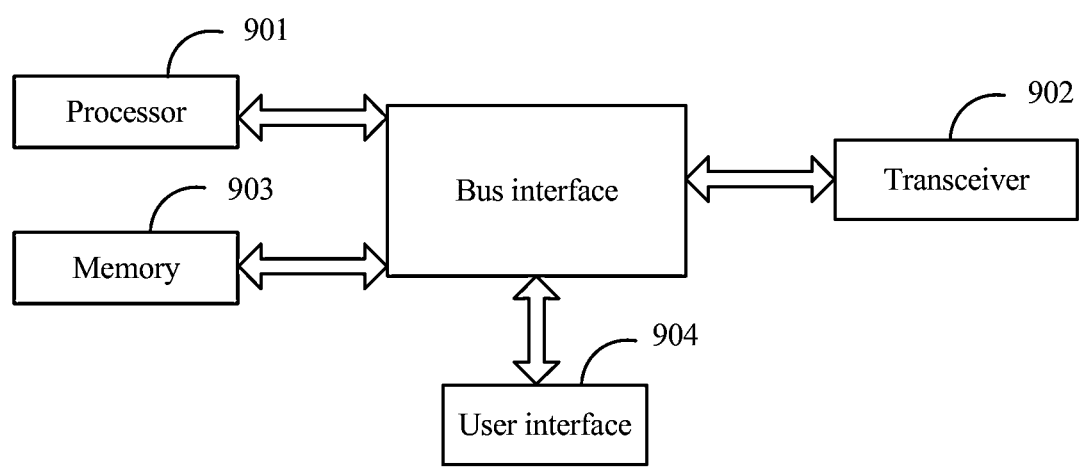
FIG. 9 is a schematic structural diagram of another terminal device according to an embodiment of the present invention.

Based on a same inventive concept, an embodiment of the present invention further provides a terminal device. The terminal device may perform a terminal device side method in the method provided in Embodiment 1, and may be a same device as the terminal device shown in FIG. 8. Referring to FIG. 9, the terminal device includes a processor 901, a transceiver 902, and a memory 903. Optionally, the terminal device further includes a user interface 904.

The processor 901 is configured to read a program in the memory 903, to execute the following process:

The processor 901 is configured to generate first information. The first information includes any one or any combination of the following: information about a first network slice, first service information, and access information of the terminal device. The processor 901 is further configured to:

send, by using the transceiver 902, a first message including the first information to a network device, where the first message is used to request to select a network slice for the terminal device; and receive, by using the transceiver 902, a second message sent by the network device, where the second message is used to indicate a network slice selected by the network device for the terminal device.

Optionally, when the first information includes the information about the first network slice, and the processor 901 generates the information about the first network slice, the processor 901 is specifically configured to:

when the terminal device has preconfigured an identifier of a unique network slice, use the unique network slice identifier as the information about the first network slice; or select a network slice identifier of a network slice with a highest priority as the information about the first network slice; or use, as the information about the first network slice, a network slice identifier of a network slice corresponding to a service initiated by the terminal device.

Optionally, the first service information includes any one or any combination of the following: a service application identifier, a flow identifier, a data packet identifier, a tunnel identifier, a radio bearer identifier, a service type, a user usage type, an access point address, and an access point identifier.

Optionally, the access information of the terminal device includes any one or any combination of the following:

a level of the terminal device, a random access channel RACH channel type, and a random access preamble sequence.

Optionally, when the terminal device has preconfigured a network slice identifier, the processor 901 is further configured to:

before the processor 902 generates the information about the first network slice, receive, by using the transceiver 902, a third message that is sent by the network device and that includes second network slice information, where the second network slice information is used to indicate a network slice selected by the network device based on a location of the terminal device; and preconfigure the network slice identifier based on the second network slice information.

Optionally, when the terminal device has preconfigured a network slice identifier, the processor 901 is further configured to:

before the processor 901 generates the information about the first network slice, receive, by using the transceiver 902, a fourth message sent by the network device, where the fourth message includes access barring information corresponding to each of at least one network slice; and learn of, based on the fourth message, access barring information corresponding to a network slice indicated by the preconfigured network slice identifier, identify a network slice that can be accessed in the network slice indicated by the preconfigured network slice identifier, and retain an identifier of the network slice that can be accessed.

Optionally, when the terminal device has preconfigured a network slice identifier, the processor 901 is further configured to:

before the processor 901 generates the information about the first network slice, receive, by using the transceiver 902, a fifth message sent by the network device, where the fifth message is used to indicate a network slice that can be accessed in at least one network slice; and learn of, based on the fifth message, a network slice that can be accessed in a network slice indicated by the preconfigured network slice identifier, and retain an identifier of the network slice that can be accessed.

Optionally, the first message further includes a network functional entity identifier.

In FIG. 9, a bus architecture may include any quantity of interconnected buses and bridges. Specifically, various circuits of one or more processors represented by the processor 901 and a memory represented by the memory 903 are interconnected. The bus architecture may further interconnect various other circuits such as a peripheral device, a voltage stabilizer, and a power management circuit. These are all well known in the art, and therefore are not further described in the specification. A bus interface provides an interface. The transceiver 902 may be a plurality of components. To be specific, the transceiver 902 includes a transmitter and a transceiver, and provides a unit configured to communicate with various other apparatuses on a transmission medium. The processor 901 is responsible for bus architecture management and general processing. The memory 903 may store data used by the processor 901 when the processor 901 performs an operation.

For different terminal devices, the user interface 904 may further be an interface that can be externally or internally connected to a required device, and the connected device includes but is not limited to a keypad, a display, a loudspeaker, a microphone, or a joystick.

Figure 10:
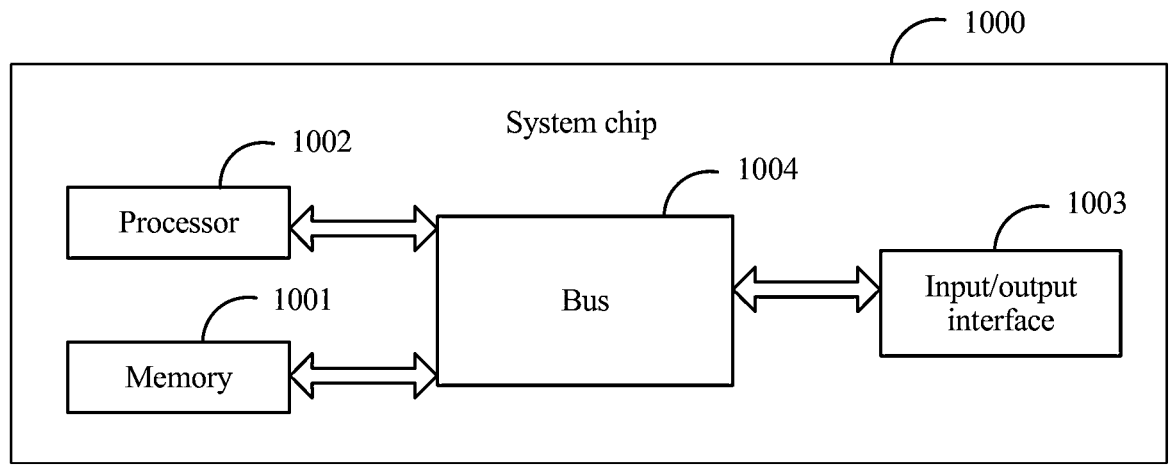
FIG. 10 is a schematic structural diagram of a system chip that is applied to a terminal device according to an embodiment of the present invention.

Based on a same inventive concept, an embodiment of the present invention further provides a system chip, and the system chip is applied to a terminal device. As shown in FIG. 10, the system chip 1000 includes a memory 1001, at least one processor 1002, an input/output interface 1003, and a bus 1004, where the memory 1001 is configured to store a program that is read by the processor 1002 when the processor 1002 performs an operation;

the processor 1002 is configured to read the program in the memory 1001, to perform an operation of a terminal device side method in the method provided in Embodiment 1; and the input/output interface 1003 is configured to receive and send data under control of the processor 1002.

Based on a same inventive concept, an embodiment of the present invention further provides a computer readable medium, configured to store a computer software instruction used to perform a terminal device side method in the method provided in Embodiment 1, and the computer software instruction includes a program designed to perform the terminal device side method in the method provided in Embodiment 1.

According to the technical solutions provided in the embodiments of the present invention, the network device can select a network slice for the terminal device. The prior-art problem that in a scenario in which one terminal device subscribes to a plurality of network slices, a network device cannot select a suitable network slice for the terminal device based on only subscription information of the terminal device can be resolved by using the technical solutions provided in the embodiments of the present invention.

Embodiment 3

Figure 11:
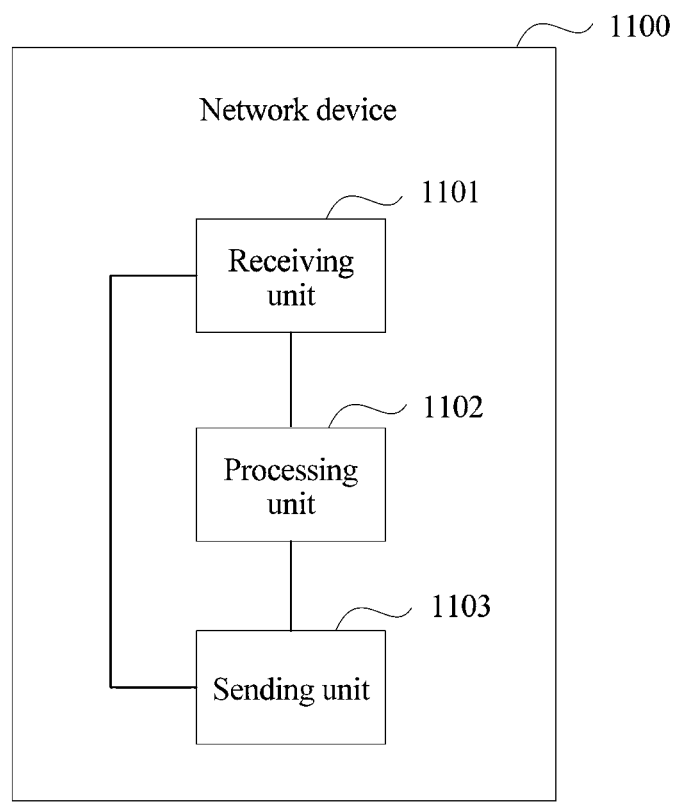
FIG. 11 is a schematic structural diagram of a network device according to an embodiment of the present invention.

Based on a same inventive concept, an embodiment of the present invention further provides a network device, and the network device may perform a network device side method in the method provided in Embodiment 1. Referring to FIG. 11, a network device 1100 includes a receiving unit 1101, a processing unit 1102, and a sending unit 1103.

The receiving unit 1101 is configured to receive a first message that is sent by a terminal device and that includes first information, where the first message is used to request to select a network slice for the terminal device, and the first information includes any one or any combination of the following: information about a first network slice, first service information, and access information of the terminal device.

The processing unit 1102 is configured to select a network slice for the terminal device based on the first information received by the receiving unit 1101.

The sending unit 1103 is configured to send a second message to the terminal device, where the second message is used to indicate the network slice selected by the processing unit 1102 for the terminal device.

Optionally, the processing unit 1102 is specifically configured to:

when the first information includes the information about the first network slice, use a network slice indicated by the information about the first network slice as the network slice selected for the terminal device; or when the first information includes the first service information, use, based on a service indicated by the first service information and a mapping relationship between a service and a network slice, a network slice corresponding to the service indicated by the first service information as the network slice selected for the terminal device; or when the first information includes the access information of the terminal device, select the network slice for the terminal device based on the access information of the terminal device.

Optionally, the first service information includes any one or any combination of the following: a service application identifier, a flow identifier, a data packet identifier, a tunnel identifier, and a radio bearer identifier.

Optionally, the access information of the terminal device includes any one or any combination of the following:

a level of the terminal device, a random access channel RACH channel type, and a random access preamble sequence.

Optionally, the processing unit 1102 is further configured to:

obtain a location of the terminal device before the receiving unit 1101 receives the first message that is sent by the terminal device and that includes the first information; and select a network slice corresponding to a service area in which the location of the terminal device lies, and determine second network slice information that is used to indicate the selected network slice.

The sending unit 1103 is further configured to:

send, to the terminal device, a third message including the second network slice information selected by the processing unit 1102, where the second network slice information is used by the terminal device to preconfigure a network slice identifier.

Optionally, the sending unit 1103 is further configured to:

send a fourth message to the terminal device before the receiving unit 1101 receives the first message that is sent by the terminal device and that includes the first information, where the fourth message includes access barring information corresponding to each of at least one network slice, and the fourth message is used by the terminal device to identify a network slice that can be accessed.

Optionally, the sending unit 1103 is further configured to:

send a fifth message to the terminal device before the receiving unit 1101 receives the first message that is sent by the terminal device and that includes the first information, where the fifth message is used to indicate a network slice that can be accessed in at least one network slice, and the fifth message is used by the terminal device to identify a network slice that can be accessed.

Optionally, the processing unit 1102 is further configured to:

after the processing unit 1102 selects the network slice for the terminal device based on the first information, when the first message further includes a network functional entity identifier, use, as a network functional entity selected for the terminal device, a network functional entity indicated by the network functional entity identifier; or after the processing unit 1102 selects the network slice for the terminal device based on the first information, select, based on the first information from a network functional entity connected to the network device 1100, a network functional entity that supports the network slice selected for the terminal device, and use the selected network functional entity as a network functional entity selected for the terminal device.

Figure 12:
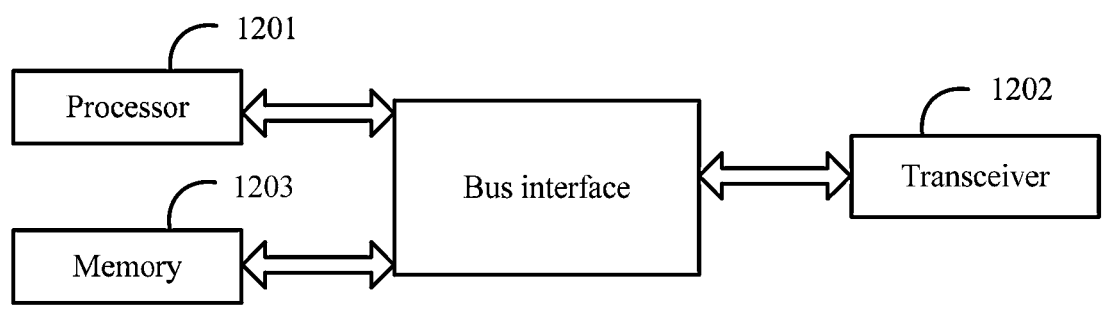
FIG. 12 is a schematic structural diagram of another network device according to an embodiment of the present invention.

Based on a same inventive concept, an embodiment of the present invention further provides a network device. The network device may perform a network device side method in the method provided in Embodiment 1, and may be a same device as the network device shown in FIG. 11. As shown in FIG. 12, the network device includes a processor 1201, a transceiver 1202, and a memory 1203.

The processor 1201 is configured to read a program in the memory 1203, to execute the following process:

The processor 1201 is configured to receive, by using the transceiver 1202, a first message that is sent by a terminal device and that includes first information, where the first message is used to request to select a network slice for the terminal device, and the first information includes any one or any combination of the following: information about a first network slice, first service information, and access information of the terminal device;

select a network slice for the terminal device based on the first information; and send a second message to the terminal device by using the transceiver 1202, where the second message is used to indicate the network slice selected by the processor 1201 for the terminal device.

Optionally, when selecting the network slice for the terminal device based on the first information, the processor 1201 is specifically configured to:

when the first information includes the information about the first network slice, use a network slice indicated by the information about the first network slice as the network slice selected for the terminal device; or when the first information includes the first service information, use, based on a service indicated by the first service information and a mapping relationship between a service and a network slice, a network slice corresponding to the service indicated by the first service information as the network slice selected for the terminal device; or when the first information includes the access information of the terminal device, select the network slice for the terminal device based on the access information of the terminal device.

Optionally, the first service information includes any one or any combination of the following: a service application identifier, a flow identifier, a data packet identifier, a tunnel identifier, and a radio bearer identifier.

Optionally, the access information of the terminal device includes any one or any combination of the following:

a level of the terminal device, a random access channel RACH channel type, and a random access preamble sequence.

Optionally, the processor 1201 is further configured to:

obtain a location of the terminal device before receiving, by using the transceiver 1202, the first message that is sent by the terminal device and that includes the first information;

select a network slice corresponding to a service area in which the location of the terminal device lies, and determine second network slice information that is used to indicate the selected network slice; and send, by using the transceiver 1202, a third message including the second network slice information to the terminal device, where the second network slice information is used by the terminal device to preconfigure a network slice identifier.

Optionally, the processor 1201 is further configured to:

send, by using the transceiver 1202, a fourth message to the terminal device before receiving, by using the transceiver 1202, the first message that is sent by the terminal device and that includes the first information, where the fourth message includes access barring information corresponding to each of at least one network slice, and the fourth message is used by the terminal device to identify a network slice that can be accessed.

Optionally, the processor 1201 is further configured to:

send, by using the transceiver 1202, a fifth message to the terminal device before receiving, by using the transceiver 1202, the first message that is sent by the terminal device and that includes the first information, where the fifth message is used to indicate a network slice that can be accessed in at least one network slice, and the fifth message is used by the terminal device to identify a network slice that can be accessed.

Optionally, the processor 1201 is further configured to:

after the processor 1201 selects the network slice for the terminal device based on the first information, when the first message further includes a network functional entity identifier, use, as a network functional entity selected for the terminal device, a network functional entity indicated by the network functional entity identifier; or after the processor 1201 selects the network slice for the terminal device based on the first information, select, based on the first information from a network functional entity connected to the network device, a network functional entity that supports the network slice selected for the terminal device, and use the selected network functional entity as a network functional entity selected for the terminal device.

In FIG. 12, a bus architecture may include any quantity of interconnected buses and bridges. Specifically, various circuits of one or more processors represented by the processor 1201 and a memory represented by the memory 1203 are interconnected. The bus architecture may further interconnect various other circuits such as a peripheral device, a voltage stabilizer, and a power management circuit. These are all well known in the art, and therefore are not further described in the specification. A bus interface provides an interface. The transceiver 1202 may be a plurality of components. To be specific, the transceiver 1202 includes a transmitter and a transceiver, and provides a unit configured to communicate with various other apparatuses on a transmission medium. The processor 1201 is responsible for bus architecture management and general processing. The memory 1203 may store data used by the processor 1201 when the processor 1201 performs an operation.

Figure 13:
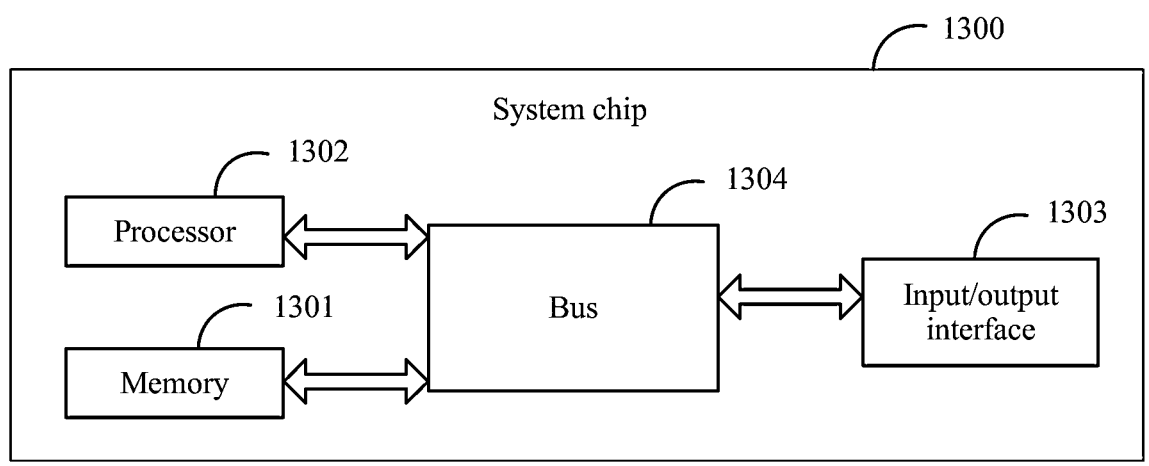
FIG. 13 is a schematic structural diagram of a system chip that is applied to a network device according to an embodiment of the present invention.

Based on a same inventive concept, an embodiment of the present invention further provides a system chip, and the system chip is applied to a network device. As shown in FIG. 13, the system chip 1300 includes a memory 1301, at least one processor 1302, an input/output interface 1303, and a bus 1304, where the memory 1301 is configured to store a program that is read by the processor 1302 when the processor 1302 performs an operation;

the processor 1302 is configured to read the program in the memory 1301, to perform an operation of a network device side method in the method provided in Embodiment 1; and the input/output interface 1303 is configured to receive and send data under control of the processor 1302.

Based on a same inventive concept, an embodiment of the present invention further provides a computer readable medium, configured to store a computer software instruction used to perform a network device side method in the method provided in Embodiment 1, and the computer software instruction includes a program designed to perform the network device side method in the method provided in Embodiment 1.

This application further provides the following embodiments:

Embodiment 1. A network slice selection method, including:

generating, by a terminal device, first information, where the first information includes any one or any combination of the following: information about a first network slice, first service information, and access information of the terminal device;

sending, by the terminal device, a first message including the first information to a network device, where the first message is used to request to select a network slice for the terminal device; and receiving, by the terminal device, a second message sent by the network device, where the second message is used to indicate a network slice selected by the network device for the terminal device.

Embodiment 2. The method according to Embodiment 1, where the first information includes the information about the first network slice, and the terminal device generates the information about the first network slice, the method includes:

when the terminal device has preconfigured an identifier of a unique network slice, using, by the terminal device, the unique network slice identifier as the information about the first network slice; or selecting, by the terminal device, a network slice identifier of a network slice with a highest priority as the information about the first network slice; or using, by the terminal device as the information about the first network slice, a network slice identifier of a network slice corresponding to a service initiated by the terminal device.

Embodiment 3. The method according to Embodiment 1 or 2, where the first service information includes any one or any combination of the following: a service application identifier, a flow identifier, a data packet identifier, a tunnel identifier, a radio bearer identifier, a service type, a user usage type, an access point address, and an access point identifier.

Embodiment 4. The method according to any one of Embodiment 1 to Embodiment 3, where the access information of the terminal device includes any one or any combination of the following:

a level of the terminal device, a random access channel RACH channel type, and a random access preamble sequence.

Embodiment 5. The method according to Embodiment 2, where when the terminal device has preconfigured a network slice identifier, before the terminal device generates the information about the first network slice, the method further includes:

receiving, by the terminal device, a third message that is sent by the network device and that includes second network slice information, where the second network slice information is used to indicate a network slice selected by the network device based on a location of the terminal device; and preconfiguring, by the terminal device, the network slice identifier based on the second network slice information.

Embodiment 6. The method according to Embodiment 2, where when the terminal device has preconfigured a network slice identifier, before the terminal device generates the information about the first network slice, the method further includes:

receiving, by the terminal device, a fourth message sent by the network device, where the fourth message includes access barring information corresponding to each of at least one network slice; and learning of, by the terminal device based on the fourth message, access barring information corresponding to a network slice indicated by the preconfigured network slice identifier, identifying a network slice that can be accessed in the network slice indicated by the preconfigured network slice identifier, and retaining an identifier of the network slice that can be accessed.

Embodiment 7. The method according to Embodiment 2, where when the terminal device has preconfigured a network slice identifier, before the terminal device generates the information about the first network slice, the method further includes:

receiving, by the terminal device, a fifth message sent by the network device, where the fifth message is used to indicate a network slice that can be accessed in at least one network slice; and learning of, by the terminal device based on the fifth message, a network slice that can be accessed in a network slice indicated by the preconfigured network slice identifier, and retaining an identifier of the network slice that can be accessed.

Embodiment 8. The method according to any one of Embodiment 1 to Embodiment 7, where the first message further includes a network functional entity identifier.

Embodiment 9. A network slice selection method, including:

receiving, by a network device, a first message that is sent by a terminal device and that includes first information, where the first message is used to request to select a network slice for the terminal device, and the first information includes any one or any combination of the following: information about a first network slice, first service information, and access information of the terminal device;

selecting, by the network device, a network slice for the terminal device based on the first information; and sending, by the network device, a second message to the terminal device, where the second message is used to indicate the network slice selected by the network device for the terminal device.

Embodiment 10. The method according to Embodiment 9, where the selecting, by the network device, a network slice for the terminal device based on the first information includes:

when the first information includes the information about the first network slice, using, by the network device, a network slice indicated by the information about the first network slice as the network slice selected for the terminal device; or when the first information includes the first service information, using, by the network device based on a service indicated by the first service information and a mapping relationship between a service and a network slice, a network slice corresponding to the service indicated by the first service information as the network slice selected for the terminal device; or when the first information includes the access information of the terminal device, selecting, by the network device, the network slice for the terminal device based on the access information of the terminal device.

Embodiment 11. The method according to Embodiment 9 or 10, where the first service information includes any one or any combination of the following: a service application identifier, a flow identifier, a data packet identifier, a tunnel identifier, and a radio bearer identifier.

Embodiment 12. The method according to any one of Embodiment 9 to Embodiment 11, where the access information of the terminal device includes any one or any combination of the following:

a level of the terminal device, a random access channel RACH channel type, and a random access preamble sequence.

Embodiment 13. The method according to any one of Embodiment 9 to Embodiment 12, where before the receiving, by a network device, a first message that is sent by a terminal device and that includes first information, the method further includes:

obtaining, by the network device, a location of the terminal device;

selecting, by the network device, a network slice corresponding to a service area in which the location of the terminal device lies, and determining second network slice information that is used to indicate the selected network slice; and sending, by the network device, a third message including the second network slice information to the terminal device, where the second network slice information is used by the terminal device to preconfigure a network slice identifier.

Embodiment 14. The method according to any one of Embodiment 9 to Embodiment 13, where before the receiving, by a network device, a first message that is sent by a terminal device and that includes first information, the method further includes:

sending, by the network device, a fourth message to the terminal device, where the fourth message includes access barring information corresponding to each of at least one network slice, and the fourth message is used by the terminal device to identify a network slice that can be accessed.

Embodiment 15. The method according to any one of Embodiment 9 to Embodiment 13, where before the receiving, by a network device, a first message that is sent by a terminal device and that includes first information, the method further includes:

sending, by the network device, a fifth message to the terminal device, where the fifth message is used to indicate a network slice that can be accessed in at least one network slice, and the fifth message is used by the terminal device to identify a network slice that can be accessed.

Embodiment 16. The method according to any one of Embodiment 9 to Embodiment 15, where after the selecting, by the network device, a network slice for the terminal device based on the first information, the method further includes:

when the first message further includes a network functional entity identifier, using, by the network device as a network functional entity selected for the terminal device, a network functional entity indicated by the network functional entity identifier; or selecting, by the network device based on the first information from a network functional entity connected to the network device, a network functional entity that supports the network slice selected for the terminal device, and using the selected network functional entity as a network functional entity selected for the terminal device.

Embodiment 17. A terminal device, including a memory, a processor, and a transceiver, where the memory is configured to store a program that is read by the processor when the processor performs an operation;

the processor is configured to read a program in the memory, to perform the method according to any one of Embodiment 1 to Embodiment 8; and the transceiver is configured to receive and send data under control of the processor.

Embodiment 18. A network device, including a memory, a processor, and a transceiver, where the memory is configured to store a program that is read by the processor when the processor performs an operation;

the processor is configured to read a program in the memory, to perform the method according to any one of Embodiment 9 to Embodiment 16; and the transceiver is configured to receive and send data under control of the processor.

According to the technical solutions provided in the embodiments of the present invention, the network device can select a network slice for the terminal device. The prior-art problem that in a scenario in which one terminal device subscribes to a plurality of network slices, a network device cannot select a suitable network slice for the terminal device based on only subscription information of the terminal device can be resolved by using the technical solutions provided in the embodiments of the present invention.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, and an optical memory) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the protection scope defined by the following claims and their equivalent technologies.

What is claimed is:

1. A network slice selection method, comprising:
receiving, by a terminal device, signaling from a core network device through a radio access network (RAN) device, wherein the signaling comprises a mapping relationship between a service and a network slice, wherein the mapping relationship comprises a service application identifier of the service and a network slice identifier of the network slice corresponding to the service;
determining, by the terminal device based on the mapping relationship, a first network slice corresponding to a service initiated by the terminal device;
generating, by the terminal device, a first message, wherein the first message comprises an identifier of the first network slice;
sending, by the terminal device, the first message to the core network device through the RAN device, wherein the first message requests the core network device to select the first network slice for the terminal device; and
after sending the first message to the core network device, receiving, by the terminal device, a second message from the core network device through the RAN device, wherein the second message indicates a second network slice selected by the core network device for the terminal device.

2. The method according to claim 1, wherein
the signaling comprises any one of the following: a radio resource control message, a non-access stratum message, or a medium access control layer message.

3. The method according to claim 1, wherein the method further comprises:
receiving, by the terminal device, a fourth message from the RAN device, wherein the fourth message comprises access barring information corresponding to each of at least one network slice; and
learning of, by the terminal device based on the fourth message, access barring information corresponding to a network slice indicated by a preconfigured network slice identifier;
identifying an accessible network slice indicated by the preconfigured network slice identifier; and
retaining an identifier of the accessible network slice.

4. A network slice selection method, comprising:
sending, by core a network device, signaling to a terminal device through a radio access network (RAN) device, wherein the signaling comprises a mapping relationship between a service and a network slice, wherein the mapping relationship comprises a service application identifier of the service and a network slice identifier of the network slice corresponding to the service;
receiving, by the core network device, a first message from the terminal device through the RAN device, wherein:
the first message requests the core network device to select a first network slice for the terminal device,
the first message comprises an identifier of the first network slice, and
the first network slice corresponds to a service initiated by the terminal device based on the mapping relationship;
after receiving the first message from the terminal device, selecting, by the core network device, a second network slice for the terminal device based on the first message; and sending, by the core network device, a second message to the terminal device through the RAN device, wherein the second message indicates the second network slice selected by the core network device for the terminal device.

5. The method according to claim 4, wherein
the signaling comprises any one of the following: a radio resource control message, a non-access stratum message, or a medium access control layer message.

6. An apparatus for a terminal device, comprising:
at least one processor; and
one or more memories coupled to the at least one processor and storing programming instructions for execution by the at least one processor to perform a method comprising:
receiving signaling from a core network device through a radio access network (RAN) device, wherein the signaling comprises a mapping relationship between a service and a network slice, wherein the mapping relationship comprises a service application identifier of the service and a network slice identifier of the network slice corresponding to the service;
determining, based on the mapping relationship, a first network slice corresponding to a service initiated by the terminal device;
generating a first message, wherein the first message comprises an identifier of the first network slice;
sending the first message to the core network device through the RAN device, wherein the first message requests the core network device to select the first network slice for the terminal device; and
after sending the first message to the core network device, receiving a second message from the core network device through the RAN device, wherein the second message indicates a second network slice selected by the core network device for the terminal device.

7. The apparatus according to claim 6, wherein
the signaling comprises any one of the following: a radio resource control message, a non-access stratum message, or a medium access control layer message.

8. The apparatus according to claim 6, wherein the programming instructions, when executed by the at least one processor, cause the apparatus to perform operations comprising:
receiving a fourth message from the RAN device, wherein the fourth message comprises access barring information corresponding to each of at least one network slice;
learning of, based on the fourth message, access barring information corresponding to a network slice indicated by a preconfigured network slice identifier;
identifying an accessible network slice indicated by the preconfigured network slice identifier; and
retaining an identifier of the accessible network slice.

9. An apparatus for a core network device, comprising:
at least one processor; and
one or more memories coupled to the at least one processor and storing programming instructions for execution by the at least one processor to perform operations comprising:
sending signaling to a terminal device through a radio access network (RAN) device, wherein the signaling comprises a mapping relationship between a service and a network slice, wherein the mapping relationship comprises a service application identifier of the service and a network slice identifier of the network slice corresponding to the service;
receiving a first message from the terminal device through the RAN device, wherein the first message requests the core network device to select a first network slice for the terminal device, wherein:
the first message comprises an identifier of the first network slice, and
the first network slice corresponds to a service initiated by the terminal device based on the mapping relationship;
after receiving the first message from the terminal device, selecting a second network slice for the terminal device based on the first message; and
sending a second message to the terminal device through the RAN device, wherein the second message indicates the second network slice selected by the core network device for the terminal device.

10. The apparatus according to claim 9, wherein the signaling comprises any one of the following: a radio resource control message, a non-access stratum message, or a medium access control layer message.

11. The method according to claim 1, wherein the second network slice is different from the first network slice.

12. The method according to claim 4, wherein the second network slice is different from the first network slice.

13. The apparatus according to claim 6, wherein the second network slice is different from the first network slice.

14. The apparatus according to claim 9, wherein the second network slice is different from the first network slice.

15. A non-transitory computer-readable storage medium storing computer instructions, that when executed by at least one processor, cause the at least one processor to perform operations comprising:
receiving signaling from a core network device through a radio access network (RAN) device, wherein the signaling comprises a mapping relationship between a service and a network slice, wherein the mapping relationship comprises a service application identifier of the service and a network slice identifier of the network slice corresponding to the service;
determining, based on the mapping relationship, a first network slice corresponding to a service initiated by the at least one processor;
generating a first message, wherein the first message comprises an identifier of the first network slice;
sending the first message to the core network device through the RAN device, wherein the first message requests the core network device to select the first network slice for the at least one processor; and
after sending the first message to the core network device, receiving a second message from the core network device through the RAN device, wherein the second message indicates a second network slice selected by the core network device for the at least one processor.

16. The non-transitory computer-readable storage medium according to claim 15, wherein
the signaling comprises any one of the following: a radio resource control message, a non-access stratum message, or a medium access control layer message.

17. The non-transitory computer-readable storage medium according to claim 15, wherein the computer instructions, when executed by the at least one processor, further cause the at least one processor to perform operations comprising:
receiving a fourth message from the RAN device, wherein the fourth message comprises access barring information corresponding to each of at least one network slice; and learning of, based on the fourth message, access barring information corresponding to a network slice indicated by a preconfigured network slice identifier;

identifying an accessible network slice indicated by the preconfigured network slice identifier; and retaining an identifier of the accessible network slice.

18. The non-transitory computer-readable storage medium according to claim 15, wherein the second network slice is different from the first network slice.

19. A non-transitory computer-readable storage medium storing computer instructions, that when executed by at least one processor, cause the at least one processor to perform operations comprising:

sending signaling to a terminal device through a radio access network (RAN) device, wherein the signaling comprises a mapping relationship between a service and a network slice, wherein the mapping relationship comprises a service application identifier of the service and a network slice identifier of the network slice corresponding to the service;

receiving a first message from the terminal device through the RAN device, wherein:
the first message requests the at least one processor to select a first network slice for the terminal device,
the first message comprises an identifier of the first network slice, and
the first network slice corresponds to a service initiated by the terminal device based on the mapping relationship;

after receiving the first message from the terminal device, selecting a second network slice for the terminal device based on the first message; and sending a second message to the terminal device through the RAN device, wherein the second message indicates the second network slice selected by the at least one processor for the terminal device.

20. The non-transitory computer-readable storage medium according to claim 19, wherein
the signaling comprises any one of the following: a radio resource control message, a non-access stratum message, or a medium access control layer message.

21. The non-transitory computer-readable storage medium according to claim 19, wherein the second network slice is different from the first network slice.

22. A communications chip comprising at least one processor, wherein the at least one processor is coupled with at least one memory that stores computer instructions, that when executed by the at least one processor, cause the communications chip to perform operations comprising:

receiving signaling from a core network device through a radio access network (RAN) device, wherein the signaling comprises a mapping relationship between a service and a network slice, wherein the mapping relationship comprises a service application identifier of the service and a network slice identifier of the network slice corresponding to the service;

determining, based on the mapping relationship, a first network slice corresponding to a service initiated by the communications chip;

generating a first message, wherein the first message comprises an identifier of the first network slice;

sending the first message to the core network device through the RAN device, wherein the first message requests the core network device to select the first network slice for the communications chip; and after sending the first message to the core network device, receiving a second message from the core network device through the RAN device, wherein the second message indicates a second network slice selected by the core network device for the communications chip.

23. The communications chip according to claim 22, wherein the signaling comprises any one of the following: a radio resource control message, a non-access stratum message, or a medium access control layer message.

24. The communications chip according to claim 22, wherein the computer instructions, when executed by the at least one processor, further cause the at least one processor to perform operations comprising:

receiving a fourth message from a radio access network device, wherein the fourth message comprises access barring information corresponding to each of at least one network slice; and learning of, based on the fourth message, access barring information corresponding to a network slice indicated by a preconfigured network slice identifier;

identifying an accessible network slice indicated by the preconfigured network slice identifier; and retaining an identifier of the accessible network slice.

25. The communications chip according to claim 22, wherein the second network slice is different from the first network slice.

26. A communications chip comprising at least one processor, wherein the at least one processor is coupled with at least one memory that stores computer instructions, that when executed by the at least one processor, cause the communications chip to perform operations comprising:

sending signaling to a terminal device through a radio access network (RAN) device, wherein the signaling comprises a mapping relationship between a service and a network slice, wherein the mapping relationship comprises a service application identifier of the service and a network slice identifier of the network slice corresponding to the service;

receiving a first message from the terminal device through the RAN device, wherein:
the first message requests the communications chip to select a first network slice for the terminal device,
the first message comprises an identifier of the first network slice, and
the first network slice corresponds to a service initiated by the terminal device based on the mapping relationship;

after receiving the first message from the terminal device, selecting a second network slice for the terminal device based on the first message; and sending a second message to the terminal device through the RAN device, wherein the second message indicates the second network slice selected by the communications chip for the terminal device.

27. The communications chip according to claim 26, wherein
the signaling comprises any one of the following: a radio resource control message, a non-access stratum message, or a medium access control layer message.

28. The communications chip according to claim 26, wherein the second network slice is different from the first network slice.

29. A communications system, comprising a terminal device and a core network device, wherein
the terminal device, comprising:
at least one first processor; and
one or more first memories coupled to the at least one first processor and storing first programming instructions for execution by the at least one first processor to perform first operations comprising:
receiving signaling from the core network device through a radio access network (RAN) device, wherein the signaling comprises a mapping relationship between a service and a network slice, wherein the mapping relationship comprises a service application identifier of the service and a network slice identifier of the network slice corresponding to the service;
determining, based on the mapping relationship, a first network slice corresponding to a service initiated by the terminal device;
generating a first message, wherein the first message comprises an identifier of the first network slice;
sending the first message to the core network device through the RAN device, wherein the first message requests the core network device to select the first network slice for the terminal device; and
after sending the first message to the core network device, receiving a second message from the core network device through the RAN device, wherein the second message indicates a second network slice selected by the core network device for the terminal device.
the core network device, comprising:
at least one second processor; and
one or more second memories coupled to the at least one second processor and storing programming instructions for execution by the at least one second processor to perform second operations comprising:
sending the signaling to the terminal device through a radio access network (RAN) device, wherein the signaling comprises a mapping relationship between a service and a network slice, wherein the mapping relationship comprises a service application identifier of the service and a network slice identifier of the network slice corresponding to the service;
receiving the first message from the terminal device through the RAN device, wherein the first message requests the core network device to select a first network slice for the terminal device, wherein:
the first message comprises an identifier of the first network slice, and
the first network slice corresponds to a service initiated by the terminal device based on the mapping relationship;
after receiving the first message from the terminal device, selecting the second network slice for the terminal device based on the first message; and
sending the second message to the terminal device through the RAN device, wherein the second message indicates the second network slice selected by the core network device for the terminal device.

30. The communications system according to claim 29, wherein the signaling comprises any one of the following: a radio resource control message, a non-access stratum message, or a medium access control layer message.

31. The communications system according to claim 29, wherein the first operations comprise:
receiving a fourth message from the RAN device, wherein the fourth message comprises access barring information corresponding to each of at least one network slice; and
learning of, based on the fourth message, access barring information corresponding to a network slice indicated by a preconfigured network slice identifier;
identifying an accessible network slice indicated by the preconfigured network slice identifier; and
retaining an identifier of the accessible network slice.

32. The communications system according to claim 29, wherein the second network slice is different from the first network slice.

* * * * *

UNITED STATES PATENT AND TRADEMARK OFFICE
CERTIFICATE OF CORRECTION

| | |
|---|---|
| PATENT NO. | : 11,678,259 B2 |
| APPLICATION NO. | : 16/367735 |
| DATED | : June 13, 2023 |
| INVENTOR(S) | : Chong Lou, Yada Huang and Jian Zhang |

It is certified that error appears in the above-identified patent and that said Letters Patent is hereby corrected as shown below:

In the Claims

Column 40/Line 47 - In Claim 4, delete "core a" and insert -- a core --.

Column 45/Line 25 - In Claim 29, delete "device." and insert -- device, --.

Signed and Sealed this
Fifth Day of September, 2023

Katherine Kelly Vidal
*Director of the United States Patent and Trademark Office*